US011300963B1

(12) United States Patent
Webster et al.

(10) Patent No.: US 11,300,963 B1
(45) Date of Patent: Apr. 12, 2022

(54) ROBOT MOVEMENT CONSTRAINT SYSTEM

(71) Applicant: AMAZON TECHNOLOGIES, INC., Seattle, WA (US)

(72) Inventors: Roger Robert Webster, Los Altos, CA (US); Eric Peter Raeber, Redwood City, CA (US); Mohit Deshpande, Beavercreek, OH (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/681,097

(22) Filed: Aug. 18, 2017

(51) Int. Cl.
| G05D 1/02 | (2020.01) |
| B25J 5/00 | (2006.01) |
| B25J 9/00 | (2006.01) |
| B25J 19/02 | (2006.01) |

(52) U.S. Cl.
CPC ............. *G05D 1/0214* (2013.01); *B25J 5/007* (2013.01); *B25J 9/0003* (2013.01); *B25J 19/021* (2013.01); *G05D 1/0231* (2013.01); *G05D 1/0257* (2013.01); *G05D 1/0268* (2013.01); *G05D 1/0276* (2013.01)

(58) Field of Classification Search
CPC .. G05D 1/0214; G05D 1/0276; G05D 1/0268; G05D 1/0257; G05D 1/0231; B25J 19/021; B25J 9/0003; B25J 5/007
USPC .......................................................... 701/28
See application file for complete search history.

(56) References Cited

U.S. PATENT DOCUMENTS

| 6,526,919 B1 | 3/2003 | Schick |
| 8,509,982 B2 | 8/2013 | Montemerlo et al. |
| 8,738,024 B1* | 5/2014 | Kerr ....................... G01S 5/0252 |
| | | 455/456.5 |
| 9,494,439 B1* | 11/2016 | Ross ..................... G05D 1/0027 |
| 9,613,386 B1 | 4/2017 | Arden et al. |
| 9,749,780 B2* | 8/2017 | Huang ................... G01S 5/0252 |
| 9,789,607 B1* | 10/2017 | Whitman ............... B25J 13/006 |
| 10,026,309 B1 | 7/2018 | Nepomuceno et al. |

(Continued)

OTHER PUBLICATIONS

An, et al., "Development of Mobile Robot SLAM Based on ROS", International Journal of Mechanical Engineering and Robotics Research, vol. 5, No. 1, Jan. 2016, Retrieved from the Internet: <URL:http://www.ijmerr.com/uploadfile/2015/1214/20151214030241558.pdf>, pp. 47-51.

Applied Motion Lab, "Navigation of Robots in Human Environments", Retrieved from the Internet: <URL:http://motion.cs.umn.edu/r/PathPlanning/VisualNavigation.pdf>, pp. 1-18.

Armeni, et al., "3D Semantic Parsing of Large-Scale Indoor Spaces", Retrieved from the Internet: <URL:http://buildingparser.stanford.edu/images/3D_Semantic_Parsing.pdf>, pp. 1-10.

(Continued)

*Primary Examiner* — Muhammad Shafi
(74) *Attorney, Agent, or Firm* — Lindauer Law, PLLC

(57) ABSTRACT

A robotic assistant comprises a plurality of sensors on a mobile chassis. An occupancy map includes obstacle cost values for particular areas or cells of the map. These obstacle cost values may be based on whether an obstacle is detected and the confidence value of that detection, estimated precision of the location of the detected object, and so forth. A set of rules for preferred locations of robot movement is used to assess the occupancy map and to determine constraint cost value for the particular areas. For example, the area in a center of a hallway may be associated with a relatively high constraint cost value. An aggregate cost value may be calculated by summing the obstacle cost value and the constraint cost value for the particular area. The aggregate cost value may be used to determine a maximum permissible speed for the robot while traversing the particular area.

20 Claims, 13 Drawing Sheets

(56) References Cited

U.S. PATENT DOCUMENTS

| | | | | |
|---|---|---|---|---|
| 2004/0263388 A1* | 12/2004 | Krumm | ............... | G01C 21/206 |
| | | | | 342/451 |
| 2005/0273917 A1 | 12/2005 | Lapossy | | |
| 2012/0083960 A1 | 4/2012 | Zhu et al. | | |
| 2012/0158178 A1* | 6/2012 | Hyung | ............... | B25J 9/1666 |
| | | | | 700/255 |
| 2013/0317944 A1* | 11/2013 | Huang | ............... | G06Q 30/0623 |
| | | | | 705/26.61 |
| 2014/0180526 A1 | 6/2014 | Deshpande et al. | | |
| 2015/0266475 A1* | 9/2015 | Tanzmeister | ...... | B60W 30/0956 |
| | | | | 701/301 |
| 2017/0021765 A1 | 1/2017 | Mori et al. | | |
| 2017/0236061 A1* | 8/2017 | Laborie | ............... | G06F 9/45558 |
| | | | | 706/46 |
| 2018/0060764 A1 | 3/2018 | Hance et al. | | |
| 2018/0061226 A1 | 3/2018 | Thelen et al. | | |
| 2018/0299882 A1 | 10/2018 | Kichkaylo | | |
| 2018/0365908 A1* | 12/2018 | Liu | .................. | G05D 1/0044 |
| 2019/0025820 A1 | 1/2019 | Ferguson et al. | | |
| 2019/0073904 A1 | 3/2019 | Heinla et al. | | |
| 2019/0107839 A1 | 4/2019 | Parashar et al. | | |
| 2019/0113925 A1 | 4/2019 | Sim | | |
| 2019/0176328 A1 | 6/2019 | Kichkaylo et al. | | |
| 2019/0212738 A1 | 7/2019 | Umetani et al. | | |
| 2019/0250269 A1 | 8/2019 | Miu | | |

OTHER PUBLICATIONS

Durrant-Whyte, et al., "Simultaneous Localisation and Mapping (SLAM): Part I the Essential Algorithms", Retrieved from the Internet: <URL:https://people.eecs.berkeley.edu/~pabbeel/cs287-fa09/readings/Durrant-Whyte_Bailey_SLAM-tutorial-I.pdf>, pp. 1-9.

Konolige, Kurt, "A Gradient Method for Realtime Robot Control", SRI International, 8 pages.

Mathematica Stack Exchange, "Image Processing: Floor Plan—Detecting Rooms' Borders (Area) and Room Names' Texts", Retrieved from the Internet: <URL:https://mathematica.stackexchange.com/questions/19546/image-processing-floor-plan-detecting-rooms-borders-area-and-room-names-t>, pp. 1-9.

Park, Jong Jin, "Graceful Navigation for Mobile Robots in Dynamic and Uncertain Environments", Dissertation Doctor of Philosophy (Mechanical Engineering) in The University of Michigan, 2016, 110 pages.

Wieser, et al., "Autonomous Robotic SLAM-based Indoor Navigation for High Resolution Sampling With Complete Coverage", Institute of Communications and Navigation, German Aerospace Center (DLR), Retrieved from the Internet: <URL:http://elib.dlr.de/88548/1/PLANS14-0108.pdf>, pp. 945-951.

Goldman, Richard A., "Non-final Office Action dated Mar. 27, 2020", U.S. Appl. No. 15/923,865, The United States Patent and Trademark Office, dated Mar. 27, 2020.

* cited by examiner

ROBOT MOVEMENT CONSTRAINT SYSTEM

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
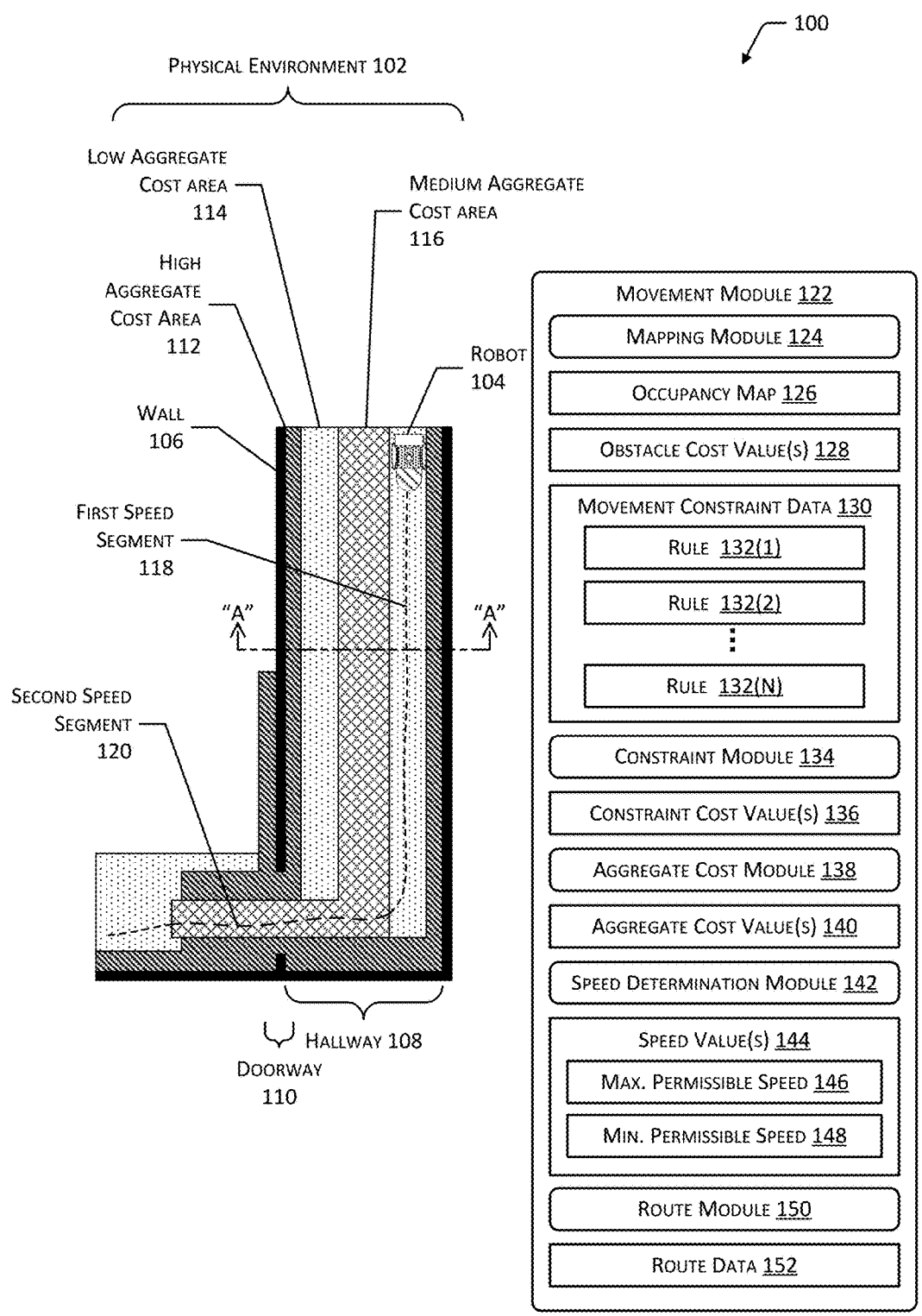
FIG. 1 illustrates a view of a physical environment in which a robot is moving and a movement module that determines speed values for that movement, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Every day a user may face a wide variety of different tasks to be completed. These tasks may include monitoring what is happening in another room of the home, staying in communication with other people, performing household chores, operating a vehicle, and so forth. Some of these tasks may either be completed by a robotic assistant or assisted at least in part by the robotic assistant.

As a robot moves about within a physical environment, considerations should be made for the presence of other users such as humans, pets, or other robots. One such consideration is the speed of the robot. A very slow moving robot may be relatively easy for another user to avoid. But such slow movement may result in the robot taking an undesirable amount of time to reach a destination, or may result in the robot blocking a passage for longer than desired.

Described in this disclosure are techniques and systems that determine one or more speed values, such as a minimum permissible speed or a maximum permissible speed for a particular area within a physical environment. These speed values may then be used to constrain movement of a robot.

The speed values may be determined based on an aggregate cost value for a particular area within a physical environment. The aggregate cost value may comprise a sum of an obstacle cost value and a constraint cost value that are associated with an area in the physical environment.

The obstacle cost value is information about whether the particular area includes an obstacle. An obstacle may comprise an object in or aspect of the physical environment that impedes movement of the robot. For example, if the values are expressed with 8 bits, an empty area may have an obstacle cost value of 0, while a wall may have an obstacle cost value of 255. In some implementations, the obstacle cost value may include or be indicative of a confidence value in the determination. The obstacle cost values for a physical environment may be determined based on pre-programmed input such as a floor plan or guided tour by a human, from simultaneous localization and mapping (SLAM) algorithms, and so forth.

The constraint cost value is determined by assessing a particular area with a set of one or more rules that are specified by movement constraint data. These rules may specify preferences with respect to how and where the robot may move. For example, the rules may specify that the robot is to avoid travel along a center section of a passageway such as a hallway or corridor, that movement by the robot in areas near doorways should be at lower speeds, that the robot should preferentially move near walls, and so forth. In one implementation, the constraint cost value may be determined by using information indicative of the confidence in the determination of a feature in the physical environment. For example, an artificial neural network may be used to determine the presence of a doorway and provide a confidence value as to the likelihood that this determination is accurate. If the confidence value associated with the determination of "doorway" exceeds a threshold value, then the area corresponding with the doorway may be assigned a particular constraint cost value as specified by the rule for "doorways".

In some implementations, the range of possible obstacle cost values and constraint cost values may be consistent. For example, both may be expressed as 8-bit values that allows for 255 possible states. However, the allowed range of the constraint cost values may be smaller than the range of the obstacle cost values. Continuing the example, while the obstacle cost values may have decimal values of between 0 and 255, the constraint cost values may be limited to decimal values of between 0 and 200.

The aggregate cost value for a particular area may comprise the sum of the obstacle cost value and the constraint cost value. In some implementations, the aggregate cost value for the areas in the physical environment may be used to determine routing. For example, a route may be calculated from an origin to a destination that exhibits a lowest overall route cost that comprises a summation of the aggregate cost values for the areas traversed by that route.

With regard to the aggregate cost value, walls or other obstructions will exhibit an aggregate cost value that exceeds a threshold value, and thus would preclude movement of the robot through that area. In other words, during routing the robot will not try to go through a hallway wall. In comparison, the presence of a relatively high value of constraint cost value for the areas in the center of a hallway will result in the robot avoiding the center of the hall and instead travelling nearer one wall or another.

Once a route has been determined, a determination is made as to what speed the robot should travel. This may include determination of one or more speed values, such as one or more of a minimum permissible speed or a maximum permissible speed. A speed value for an area may be determined based at least in part on the aggregate cost value for that area. The speed value may be proportionate to the aggregate cost value. For example, the maximum permissible speed may be inversely proportional to the aggregate cost value, such that a relatively high maximum permissible speed is determined when the aggregate cost value is low while a relatively low maximum permissible speed is determined when the aggregate cost value is high.

These speed values may specify one or more of an upper limit or a lower limit on the speed of the robot. The actual speed of the robot may then be determined. In one implementation, the speed at which the robot is set to traverse the area may be the maximum permissible speed. In another implementation, the speed at which the robot is set to traverse the area may be based on other factors such as curvature of the path through the area, kinematics of the robot, type of flooring surface in that area, and so forth. For example, the actual speed of the robot may be lower while traveling an "S" shaped path than when travelling in a straight line. However, the maximum permissible speed may set an upper limit on the actual speed the robot is allowed to attain in that area. The techniques used to determine the speed values as used herein may thus be used either instead of, or in conjunction with, other techniques to determine the speed at which to move a robot in the physical environment.

By using the techniques described in this disclosure, the operation of a robot may be constrained in a way that improves the interaction between the robot and other users. For example, the speed of the robot may be constrained so that it moves more slowly at points where the path of the robot and another user may intersect, such as at a doorway. In a similar fashion, the route of the robot may include consideration of the constraint cost values for particular areas. In another example, the robot may have a route that avoids the center of a hallway as much as possible, but would cross the hallway as necessary to get the robot to its destination.

Illustrative System

FIG. 1 illustrates a view 100 of aa physical environment 102 in which a robot 104 or other automated guided device is moving. The robot may include one or more computing devices, sensors, and a drive system. The computing devices may gather sensor data using the sensors and use this sensor data to control a drive system that moves the robot within the physical environment 102. For example, the robot 104 may have a drive system comprising wheels that are driven by a motor.

In other implementations, other types of automated guided device (AGD) may use the systems and techniques described herein. For example, the AGD may comprise an autonomous ground vehicle that is moving on a street, an autonomous aerial vehicle in the air, and so forth.

The physical environment 102 may include a residence, office, warehouse, medical facility, and so forth. Within the physical environment 102 are various obstacles. Obstacles are objects in or aspects of the physical environment that impede movement of the robot 104. In this illustration, a portion of a house is shown which includes features such as walls 106, a hallway 108, and a doorway 110. Various users may be in motion and present in the physical environment 102. For example, the users may include human operators, pets, other robots, and so forth. The robot 104 needs to be able to move about the physical environment 102 in a way that does not interfere with these other users, while also allowing that movement to be expeditious.

The robot 104 may use various techniques to plan a route from one location to another. This route planning avoids known fixed obstacles that are impossible to traverse, such as walls 106. The route planning may use various techniques to determine the route. However, such route planning may not consider the need to operate in the physical environment 102 that includes other users.

While travelling the route, the robot 104 may encounter users or other objects. The robot 104 is configured with various safety features, such as collision avoidance systems that allow the robot 104 to avoid or mitigate collision with an object such as a user or pet that appears in the path. However, such collision avoidance systems are reactive in that they respond to the presence of an object that the robot 104 is deemed unable to traverse. For example, low objects on the floor that the robot 104 can drive over may not activate the collision avoidance system.

Once a route has been planned, the speed of the robot 104 needs to be determined. Some techniques set the speed of the robot 104 based on the curvature of a particular portion of the path specified by the route. The more curved the path is (such as a turn) the slower the speed. This technique addresses the kinematic aspects of speed selection, such as avoiding taking a turn so quickly that the robot 104 topples over, but they do not address the interaction of the robot 104 with other users of the physical environment 102.

Described in this disclosure are techniques and systems to incorporate into the movement of the robot 104 "soft" or "preferred" movement constraints that may be used for one or more of route planning or speed determination. These movement constraints may be used to codify where the robot 104 should go or avoid, areas within which the robot 104 should proceed more slowly, and so forth. The movement constraints may be expressed as rules. For example, a rule may specify that the robot 104 is to avoid travel through the center of a hallway 108, that being an area that the users are most likely to use. In another example, a rule may specify that areas near a doorway 110 are to be traversed more slowly to allow other users the opportunity to react to the presence of the robot 104.

An area within the physical environment 102 may be designated based on the comparison of an aggregate cost value to one or more thresholds. In this illustration, high aggregate cost areas 112 are depicted proximate to walls 106 and other obstacles that the robot 102 cannot traverse. A low aggregate cost area 114 specifies an area in which the robot 102 may move freely and at a relatively high speed. For example, the low aggregate cost areas 114 extend along the sides of the hallway 108. A medium aggregate cost area 116 is an area which the robot 104 will avoid, but through which traversal is possible. For example, the medium aggregate cost area 116 is an area within the center of the hallway 108 and through the doorway 110. These areas are presented by way of illustration, and not necessarily as a limited.

In one implementation, the speed of the robot 104 may be constrained based on the aggregate cost for a particular area. For example, the lower the aggregate cost for an area, the greater a maximum permissible speed of the robot 104. In this illustration, a first speed segment 118 is a portion of the route of the robot 104 that is within the low aggregate cost area 114. In this area, the robot 104 may have a maximum permissible speed of 2 meters per second (m/s). In comparison, the second speed segment 120 of the route is a portion of the route of the robot 104 that is within the medium aggregate cost area 116. In this area, the robot 104 may have a maximum permissible speed of 0.5 m/s. Once outside of this area and into another low aggregate cost area 114, the maximum permissible speed may again be increased to 2 m/s.

A movement module 122 is configured to provide this functionality. The movement module 122 may be executed on one or more of the robot 104 or an external computing device, such as a server. Some of the operations of the movement module 122 may be pre-calculated while others may be determined in real-time. The following modules and data are depicted as within the movement module 122, but it is understood that in other implements one or more of these modules or data may be present in other modules, executing on other devices, and so forth.

A mapping module 124 is used to generate an occupancy map 126. The mapping module 124 may use data from one or more sensors. These sensors may be on the robot 104. The occupancy map 126 may include feature data that provides information about the location in space of various features, such as walls 106, hallways 108, doorways 110, stairwells, furniture, and so forth. Some of features, such as walls, may be obstacles. The obstacle may comprise an object or feature that is deemed to be impassable to the robot 104. For example, the robot 104 may unable to traverse stairs, and so a stairwell would be an obstacle. In another example, the type of floor covering may be an obstacle, such as a long fiber carpet that would interfere with operation of the wheels. In yet another example, the hazard may comprise something on the floor, such a food spill on the floor, or a flooded area.

Features may be detected using various techniques. In one implementation, information about the physical environment 102 may be processed using semantic parsing to identify particular features in that environment and generate the feature data. For example, sensor data may be processed to determine semantically meaningful spaces, such as rooms that are associated with particular locations in space. The spaces may then be parsed into their structural and building elements, such as walls 106, stairways, and so forth. Objects within these spaces may then be parsed to determine furniture, decorations, and so forth. As a result of this analysis, features on the occupancy map 126126 may be labeled or associated with particular metadata. For example, the occupancy map 126 may include metadata that indicates the doorways 110 are "doorways".

In another implementation, other techniques may be used to generate feature data by identifying particular features, such as walls 106, doorways 110, and so forth. For example, a distance transform function may be used to determine the center of a room. A watershed transform may be inverted used relative to the center of the room to identify the approximate location of walls 106.

In still another implementation, a user or other human operator may manually provide input that designates particular features. For example, a user may take the robot 104 on a guided tour, designating out particular features such as doorways 110, hallways 108, stairwells, and so forth. Data may then be stored in the occupancy map 126 indicating that designation.

Other implementations may utilize various combinations. For example, the robot 104 may attempt to determine the particular features and then may provide a user with a user interface to confirm that determination.

The mapping module 124 may utilize a simultaneous location and mapping (SLAM) algorithm that allows the robot 104 to maintain information about its relative position within the physical environment 102 while generating a map that is indicative of the location in that environment 102 of those obstacles. For example, the tools available at www.openslam.org provide one implementation of the SLAM algorithm.

The occupancy map 126 provides information about the spatial arrangement of obstacles in the physical environment 102. The occupancy map 126 may be divided up into various areas. In one implementation the occupancy map 126 may be divided into cells. These cells may be square, hexagonal, triangular, and so forth. The cells may be of identical dimensions. For example, the cells may comprise squares that measure 2×2 inches. These cells are representative of a particular area within a physical environment 102.

The occupancy map 126 includes information indicative of obstacle cost values 128 for a given area or portion of an area. The obstacle cost value 128 comprises information indicative of whether that particular area, or portion thereof, contains an obstacle. These obstacles may include fixed features such as walls 106 or stairwells, moveable objects such as furniture, and so forth that are deemed to be impassable to the robot 104.

The obstacle cost value 128 may be determined using a variety of techniques. For example, sensor data about the particular area may be obtained by one or more sensors. These sensors may be onboard the robot 104, may be mounted elsewhere within the physical environment 102, and so forth.

The sensor data may be processed to determine if the area is passable to the robot 104. For example, the sensor data obtained from a camera may be processed using computer vision techniques to determine if there are any obstacles such as drops or objects in the area. In another example, the sensor data obtained from a structured light system that comprises depth data about the area may be processed to determine if any obstacles are present. An area that is deemed passable may be associated with a first predetermined obstacle cost value, such as "0" while an area that is deemed impassable may be associated with a second predetermined cost value, such as "255".

In one implementation, the obstacle may be identified and associated with a particular obstacle cost value 128. For example, doorframe and door associated with a doorway 110 may be assigned a first obstacle cost value 128 while walls 106 may be assigned a second obstacle cost value 128, and so forth. In other implementations, all obstacles may be assigned a predetermined obstacle cost value 128.

In some implementations, the occupancy map 126 may include information about transient or moving objects. For example, the occupancy map 126 may include information about where a human is at a particular time.

The obstacle cost value 128 may comprise a numeric value indicative of a confidence value as to the presence of an obstacle. In another implementation the confidence value may be incorporated into the obstacle cost value 128. For example, an obstacle cost value 128 that is close to a maximum or minimum possible value may be representative of a high confidence value as to whether an obstacle is present or not. In other implementations, the obstacle cost value 128 may comprise a separate confidence value. For example, the obstacle cost value 128 may be indicative of the obstacle, such as a single bit binary value, and a separate confidence value may be expressed separately from the obstacle cost value 128.

As additional sensor data is obtained, the precision and accuracy of the occupancy map 126 may improve. For example, as the robot 104 moves about the physical environment 102 and obtains sensor data from different locations in the physical environment 102 and from different poses, the accuracy as to where the wall 106 is located may be improved. Over time the obstacle cost value 128 for a particular area may change. During operation of the system, the occupancy map 126 may thus change from time to time.

Movement constraint data 130 may comprise one or more rules 132(1), 132(2), . . . 132(N). A rule 132 is representative of a constraint on related to movement of the robot 104, such as constraints on one or more of speed, places within the physical environment 102 that the robot 104 is to avoid, and so forth. For example, the rule 132(1) may specify that the robot 104 is to avoid travelling along the center section of a hallway 108. In another example, the rule 132(2) may specify that the robot 104 is to move through a doorway 110 in the center of the doorway 110. In yet another example, the rule 132(3) may specify that the robot 104 is to slow down while crossing in front of a doorway 110. In still another example, the rule 132(4) may specify that the robot 104 is to avoid areas around tables. In yet another example, the rule 132 may specify that the robot 104 is preferred to move near walls 106. Some rules 132 may specify preferential areas. For example, a rule 132 may designate an area within a room that the robot 104 is preferred to pass through.

A constraint module 134 uses the occupancy map 126 and the movement constraint data 130 to determine constraint cost values 136 for particular areas within the physical environment 102. For example, the occupancy map 126 may comprise information about features that are designated in the occupancy map 126, such as "doorway", "hallway", "furniture", "wall". The constraint module 134 may analyze the occupancy map 126 to determine the applicability of a particular rule 132. For example, rules 132(2) and 132(3) that are associated with doorways 110 may be associated with the portions of the occupancy map 126 that are within a threshold distance of features in the occupancy map 126 that are designated as doorways 110.

In some implementations, the constraint module 134 may use one or more classifiers, artificial neural networks (ANN), or other techniques to determine whether which rule 132 corresponds to which areas in the occupancy map 126. For example, an ANN may be trained to recognize doorways 110 from the sensor data, and features designated as doorways 110 by the ANN may have the corresponding rules 132 applied.

The constraint module 134 may generate the constraint cost value 136 for an area using a variety of techniques. In one implementation, feature data is generated that is indicative of a presence of a feature in the physical environment 102. For example, the occupancy map 126 may be processed to determine presence of a feature such as "doorway". In another example, the occupancy map 126 may store the feature data, such as data that designates a particular portion of the structure as a wall 106, hallway 108, doorway 110, and so forth.

A rule may be determined that corresponds to the feature. For example, the movement constraint data 130 may be searched to find those rules 132 that are associated with feature data indicative of "doorway".

Each rule 132 may be associated with a particular type of feature. The particular type of feature may be associated with a predetermined value of constraint cost value 136. In one implementation, the constraint cost value 136 may be a predetermined value. For example, a human operator may specify a predetermined value of constraint cost value 136 for a rule 132.

The predetermined value may be retrieved for a particular feature. For example, a lookup table may be used to retrieve a predetermined value of "75" for the constraint cost value 136 of a feature that is designated as a "doorway". That predetermined value may be subsequently used as the constraint cost value 136 for that area.

The rules 132 may use the same predetermined value of the constraint cost value 136, or the predetermined value of the constraint cost value 136 may be specific to a particular rule 132. For example, the particular rule 132 associated with avoidance of the center of a hallway 108 may be assigned the predetermined value of "67".

In some situations, multiple rules 132 may apply to the same area. The constraint cost value 136 may then be based on the predetermined values of constraint cost values 136 corresponding to those rules 132. For example, the constraint cost value 136 for the particular area may comprise a sum of the predetermine values of the constraint cost values 136 for those rules 132 associated with the particular area.

In another implementation, aa confidence value may be determined that is indicative of the accuracy in the determination of the feature. For example, the module providing the semantic parsing of the occupancy map 126 may utilize an artificial neural network and may provide as output a confidence value for determination of the feature. The feature may then be associated with one or more of the rules 132. The confidence value may be generated based on how the feature was identified. For example, the confidence value may be high when the feature, such as a doorway 110, has been specified based on user input. In another example, the output of a feature recognition module or other module used to determine a feature may generate a confidence value about the feature.

In some implementations, the constraint cost value 136 may be generated by multiplying the confidence value with the predetermined value. For example, if the predetermined value for that type of feature is 90 and the confidence value for that particular feature is 0.8, the constraint cost value 136 for the area that includes that feature would be 72.

In other implementations, other techniques may be used to determine the constraint cost value 136. For example, the rule 132 may specify a constraint cost value 136 based on distance to a particular feature or portion thereof. In yet another implementation, the mathematical sign of the constraint cost value 136 may be indicative of whether an area is to be avoided or preferred. For example, a positive cost constraint value 136 may be indicative that the area is to be avoided, while a negative cost constraint value 136 may be indicative of a preferred area into which travel of the robot 104 is encouraged.

An aggregate cost module 138 may be used to determine aggregate cost values 140 for one or more areas of the physical environment 102, such as described in the occupancy map 126. For example, the aggregate cost module 138 may generate the aggregate cost value 140 for cells in the occupancy map 126. In one implementation, the aggregate cost module 138 may generate aggregate cost values 140 for all cells or areas in the occupancy map 126. In another implementation, the aggregate cost module 138 may determine the aggregate cost values 140 for those areas that are within a threshold distance of, or otherwise associated with, a projected route. For example, if a projected route for the robot 104 passes through several rooms except the music room, then the aggregate cost module 138 may be used to generate the aggregate cost values 140 for the areas in the rooms expected to be traversed and omitting the areas in the music room.

The aggregate cost values 140 are based on the obstacle cost values 128 and constraint cost values 136. For example, the aggregate cost values 140 may comprise a sum of the obstacle cost value 128 and the constraint cost value 136 that are associated with a particular area in the physical environment 102. In another example, the aggregate cost value 140 may comprise a difference between the obstacle cost value 128 and the constraint cost value 136 that are associated with a particular area in the physical environment 102. In other implementations, other functions may be used. For example, the aggregate cost value 140 may comprise a weighted average of the obstacle cost value 128 and the constraint cost value 136.

The aggregate cost value 140 may be used by a speed determination module 142 to determine one or more speed values 144 associated with a particular area. For example, the speed values 144 may include a maximum permissible speed 146, a minimum permissible speed 148, and so forth for particular cells. In one implementation, the speed values 144 may be proportional to the aggregate cost value 140. For example, as the aggregate cost value 140 increases, the maximum permissible speed 146 may decrease. Likewise, as the aggregate cost value 140 decreases, the maximum permissible speed 146 may increase. The proportionality may be linear or exponential. In some implementations a step function may be used to determine a speed value 144 based on a particular aggregate cost value 140. In some implementations, the speed determination module 142 may directly utilize the obstacle cost value 128 and the constraint cost value 136 as input to determine the speed values 144.

The maximum permissible speed 146 may be used to specify an upper limit on the speed at which the robot 104 will travel. For example, while travelling in a straight line, the robot 104 may move at the maximum permissible speed 146. Other factors may be considered which reduce the actual speed of the robot 104 in a particular area of the physical environment 102. For example, if the path of the robot 104 is curved, the actual speed may be less than the maximum permissible speed 146 to avoid tipping of the robot 104. In another example, the presence of an object, such as a user stepping in front of the robot 104 would result in a reduction in the actual speed of the robot 104.

The minimum permissible speed 148 may specify a lower limit on the speed at which the robot 104 will travel. The minimum permissible speed 148 may be conditional, such that the minimum permissible speed 148 applies only when no hazards are present. For example, it may be desirable to set a minimum permissible speed 148 at which the robot 104 will move through a doorway 110, to reduce the amount of time spent blocking the doorway 110. The robot 104 may still travel at a speed less than the minimum permissible speed 148 or stop moving altogether in some situations. For example, the robot 104 would stop to avoid hitting an object such as a user stepping in front of the robot 104.

In some implementations smoothing techniques may be used for the speed values 144 in adjacent areas. For example, a cell may have a very large aggregate cost value 140 while an adjacent sell may have a very low aggregate cost value 140. A smoothing algorithm may be used to change the aggregate cost values 140 of one area based on the aggregate cost values 140 of an adjacent cell, reducing the abruptness of a change in aggregate cost values 140 from one cell to another. In other implementations the smoothing algorithm may be applied while determining a speed along a route to constraint changes in velocity and reduce or avoid abrupt changes in speed.

A route module 150 may be used to generate route data 152. The route module 150 may accept input as information indicative of a destination for the robot 104, the occupancy map 126, and other information. For example, the route module 150 may receive instructions to direct the robot 104 to the living room. The route module 150 may receive, or determines, the present location within the physical environment 102 and then determines route data 152 that describes one or more routes for the robot 104 to travel to reach the destination.

In one implementation, the route module 150 may determine the route to be traversed. The speed determination module 142 may be used to determine the speed values 144 for the areas that are traversed by the route. The speed values 144 may then be incorporated into the route data 152 to provide information indicative of where to move the robot 104 and how fast to move the robot 104.

In another implementation, the route module 150 may determine the route based at least in part on the aggregate cost values 140. By utilizing the aggregate cost values 140, the resulting route considers the presence of known obstacles and the movement constraints described in the rules 132. For example, the route module 150 may be configured to determine a route that minimizes a lowest overall route cost. The overall route cost may comprise the sum of the aggregate cost values 140 for the areas along the proposed route. A possible route from the origin to the destination may be determined by considering a gradient of the aggregate cost values 140.

In some implementations the route module 150 may consider the speed values 144 to select between several possible routes. For example, the route module 150 may use the speed values 144 for the areas along the prospective route to estimate the speed of the robot 104 in the various areas, and determine a total time to move. The prospective route having the shortest transit time may be selected and used.

The route data 152 may comprise information that may be used to direct the motion of the robot 104 and the speed thereof. For example, the route data 152 may comprise coordinates of waypoints to be traversed, speed values 144 for route segments between the waypoints, and so forth.

Instead of, or in addition to, the designation of areas within the physical environment 102, in some implementations the occupancy map 126 may be represented as point clouds. Points in the point cloud are representative of a particular location in three-dimensional space, such as defined by X, Y, and Z coordinates. The points may be representative of a region within which an object was detected by one or more sensors. The region may comprise a two-dimensional area or a three-dimensional volume. For example, a point cloud of an object may comprise an arrangement of points that are indicative of a region in space that is bounded by a surface of an object. This surface may be represented in the occupancy map 126 to describe the region within which the object is deemed to be present in the physical environment 102.

As described above, over time the occupancy map 126 may change. For example, additional sensor data obtained over time may result in more precise positioning of obstacles in the environment, resulting in changes to the occupancy map 126. As a result, the obstacle cost value 128 for a particular area may change. For example, as the location of a wall 106 is determined with greater precision and the occupancy map 126 updated, the area next to the wall with grid values having large obstacle cost values may be reduced in size as some cells are determined to be empty while others are confirmed as containing the wall 106.

The movement module 122 is responsive to changes over time due to these and other updates to the occupancy map 126. As a result, subsequent determinations of the maximum permissible speed 146 may change over time. For example, as the occupancy map 126 is updated over time to indicate that there are no obstacles in particular areas, the obstacle cost values 128 for those areas decreases, resulting in an increase in the maximum permissible speed 146 for those areas. Continuing the example, the route may change as well as the size and shape of low aggregate cost areas 114 changes.

Figure 2:
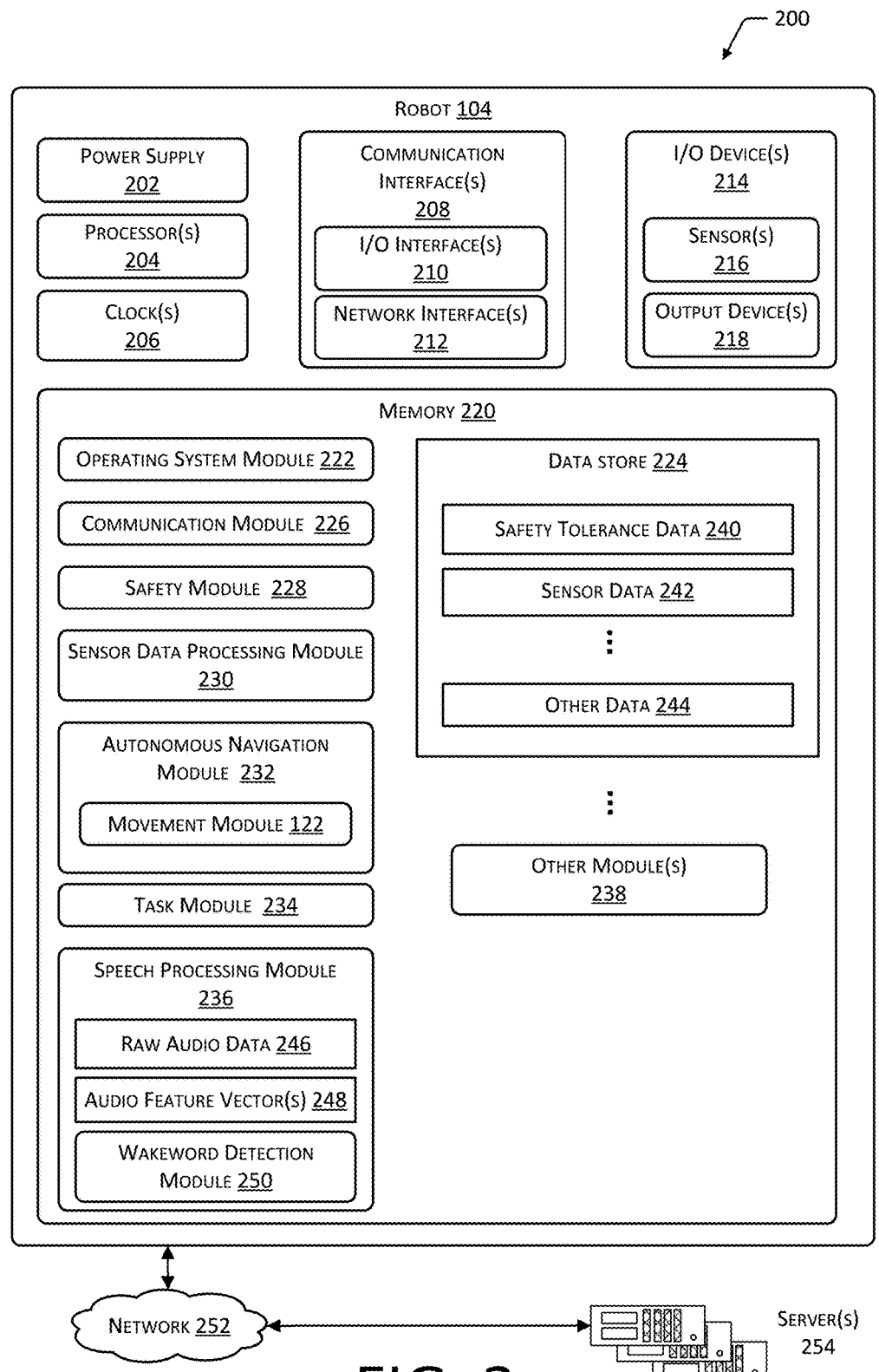
FIG. 2 is a block diagram of the robot, according to some implementations.

FIG. 2 is a block diagram 200 of the robot 104, according to some implementations.

The robot 104 may include one or more power supplies 202 to provide electrical power suitable for operating the components in the robot 104. The one or more power supplies 202 may comprise batteries, capacitors, fuel cells, photovoltaic cells, wireless power receivers, wireless power receivers, conductive couplings suitable for attachment to an external power source such as provided by an electric utility, and so forth. The robot 104 may implement multiple separate power supplies 202. For example, a first power supply may be used to provide electrical power to one or more motors of the robot 104 while a second power supply is used to provide electrical power to other electronics such as processors, communication interfaces, sensors, and so forth.

The robot 104 may include one or more hardware processors 204 (processors) configured to execute one or more stored instructions. The processors 204 may comprise one or more cores. The processors 204 may include microcontrollers, systems on a chip, field programmable gate arrays, digital signals processors, graphic processing units, general processing units, and so forth. One or more clocks 206 may provide information indicative of date, time, ticks, and so forth. For example, the processor 204 may use data from the clock 206 to associate a particular interaction with a particular point in time.

The robot 104 may include one or more communication interfaces 208 such as input/output (I/O) interfaces 210, network interfaces 212, and so forth. The communication interfaces 208 enable the robot 104, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more of a sensor 216, keyboard, mouse, scanner, and so forth. The I/O devices 214 may also include output devices 218 such as one or more of a motor, light, speaker, display, projector, printer, and so forth. In some embodiments, the I/O devices 214 may be physically incorporated with the robot 104 or may be externally placed.

The network interfaces 212 may be configured to provide communications between the robot 104 and other devices such as other robots 104, a docking station, routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi®, Bluetooth®, Bluetooth® Low Energy, ZigBee®, and so forth.

The robot 104 may also include one or more busses or other internal communications hardware or software that allow for the transfer of data between the various modules and components of the robot 104.

As shown in FIG. 2, the robot 104 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the robot 104. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the I/O interfaces 210, the I/O devices 214, the communication interfaces 208, and provide various services to applications or modules executing on the processors 204. The OS module 222 may implement a variant of the FreeBSD® operating system as promulgated by the FreeBSD Project; other UNIX® or UNIX-like variants; a variation of the Linux® operating system as promulgated by Linus Torvalds; the Windows® operating system from Microsoft Corporation of Redmond, Wash., USA; the Robot Operating System (ROS) as promulgated at www.ros.org, and so forth.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other robots 104, servers, network attached storage devices, and so forth.

A communication module 226 may be configured to establish communication with other devices, such as other robots 104, an external server, a docking station, and so forth. The communications may be authenticated, encrypted, and so forth.

Other modules within the memory 220 may include a safety module 228, a sensor data processing module 230, an autonomous navigation module 232, the movement module 122, a task module 234, a speech processing module 236, or other modules 238. The modules may access data stored within the data store 224, such as safety tolerance data 240, sensor data 242, or other data 244.

The safety module 228 may access safety tolerance data 240 to determine within what tolerances the robot 104 may operate safely within the physical environment 102. For example, the safety module 228 may be configured to stop the robot 104 from moving when a carrying handle is extended. In another example, the safety tolerance data 240 may specify a minimum sound threshold which, when exceeded, stops all movement of the robot 104. Continuing this example, detection of sound such as a human yell would stop the robot 104. In another example, the safety module 228 may access safety tolerance data 240 that specifies a minimum distance from an object that the robot 104 may maintain. Continuing this example, when a sensor 216 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 228 may be implemented as hardware, software, or a combination thereof.

The safety module 228 may control other factors, such as a maximum speed of the robot 104 based on information obtained by the sensors 216, precision and accuracy of the sensor data 242, and so forth. For example, detection of an object by an optical sensor 216 may include some error, such as when the distance to an object comprises a weighted average between an object and a background. As a result, the maximum speed permitted by the safety module 228 may be based on one or more factors such as the weight of the robot 104, nature of the floor, distance to object, and so forth. In the event that the maximum permissible speed 146 differs from the maximum speed permitted by the safety module 228, the lesser speed may be utilized.

The sensor data processing module 230 may access sensor data 242 that is acquired from one or more the sensors 216. The sensor data processing module 230 may provide various processing functions such as de-noising, filtering, change detection, and so forth. Processing of sensor data 242, such as images from a camera sensor 216, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO™ machine vision library as promulgated by Omron Corporation of Kyoto, Japan, may be used to process the sensor data 242. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 242 or other data 244. For example, the ANN may be a trained using a supervised learning algorithm such that object identifiers are associated with images of particular objects within training images provided to the ANN. Once trained, the ANN may be provided with the sensor data 242 and produce output indicative of the object identifier.

The autonomous navigation module 232 provides the robot 104 with the ability to navigate within the physical environment 102 without real-time human interaction. In some implementations, the autonomous navigation module 232 may incorporate one or more functions of the movement module 122. For example, the autonomous navigation module 232 may implement one or more simultaneous localization and mapping ("SLAM") techniques to determine the occupancy map 126. The SLAM algorithms may utilize one or more of maps, algorithms, beacons, or other techniques to provide navigational data. The navigational data may then be used to determine a path which is then subsequently used to determine a set of commands that drive the motors connected to the wheels. For example, the autonomous navigation module 232 may access environment map data during operation to determine relative location, estimate a path to a destination, and so forth.

The autonomous navigation module 232 may include an obstacle avoidance module. For example, if an obstacle is detected along a planned route, the obstacle avoidance module may re-route the robot 104 to move around the obstacle or take an alternate route. While avoiding an obstacle, the movement of the robot 104 may be affected as described by the movement module 122. For example, the constraint cost values 136 may be considered in determining the alternative route around the obstacle.

The autonomous navigation module 232 may utilize various techniques during processing of sensor data 242. For example, image data obtained from cameras may be processed to determine one or more of corners, edges, planes, and so forth. In some implementations corners may be detected and the coordinates of those corners may be used to produce point cloud data.

The occupancy map 126 may be manually or automatically determined. Continuing the example, during the learning phase, or subsequent operation, the robot 104 may generate an occupancy map 126 that is indicative of locations of obstacles such as chairs, doors, stairwells, and so forth.

In some implementations, the occupancy map 126 may include floor characterization data. The floor characterization data is indicative of one or more attributes of the floor at a particular location within the physical environment 102. During operation of the robot 104, floor characterization data may be obtained. The floor characterization data may be utilized by one or more of safety module 228, the autonomous navigation module 232, the task module 234, or other modules 238. For example, the floor characterization data may be used to determine if an unsafe condition occurs such as a wet floor. In another example, the floor characterization data may be used by the autonomous navigation module 232 assist in the determination of the current location of the robot 104 within the home. For example, if the autonomous navigation module 232 determines that the robot 104 is located in the dining room, but the floor characterization data indicates that the floors consistent with the living room, an error condition may be generated in which other techniques are used to determine the location of the robot 104 or otherwise resolve the difference. For example, the robot 104 may attempt to return to the docking station and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the robot 104 may use speech synthesis to ask the user "what room is this?" during a training phase. The utterance of the user may be received by the microphone array and the audio data "this is the living room" may processed and subsequently used to generate the location designator. The floor type may comprise information indicative of the type of flooring associated with a particular location designator. For example, the floor type may be indicative of types such as carpet, wood, tile, and so forth. The floor texture comprises information indicative of the surface texture of the floor, such as whether it is rough, smooth, medium, and so forth. The floor texture may be determined using data obtained from a floor optical motion sensor (FOMS) that is described below with regard to FIG. 3. For example, the texture may be detectable by the FOMS. The coefficient of friction provides data indicative of how slippery the floor is. For example, a very low coefficient of friction is indicative of a slippery surface while high coefficient of friction is a surface in which slippage is minimal. In one implementation, the coefficient of friction may be determined based on data from a friction probe that is in contact with the floor. In another implementation, a predetermined amount of breaking or drag may be applied to one or more of the wheels and the coefficient of friction may be determined based on previously defined parameters such as wheel resistance, amount of breaking applied, amount of power applied to drive wheels, and so forth. In effect, this implementation uses one of the wheels to provide selective drag that is then used to determine the coefficient of friction.

The surface resistivity comprises data indicative of the electrical resistivity of the surface. For example, surface resistivity may be measured between two or more of the conductive wheels as described above. Different types of floor may exhibit different surface resistivity, and changes in that surface resistivity may be used indicate changing conditions. For example, a change in the surface resistivity for a particular portion of the floor may be indicative of the presence of water or other liquid on the floor.

The color of the floor may be determined using input from one or more of the cameras 344, the FOMS 316, and so forth. For example, one or more the navigation cameras 344 that are mounted on the front of the robot 104 may be used to acquire color data that is used to determine a color of the floor. In another example, where the FOMS 316 utilize optoelectronic devices that can determine different colors, output from the FOMS 316 may be used to provide the color data.

The autonomous navigation module 232 may be used to move the robot 104 from a first location to a second location within the physical environment 102. This movement may be responsive to determination made by an onboard processor 204, in response to a command received via one or more communication interfaces 208 or a sensor 216, and so forth. For example, an external server may send a command that is subsequently received using a network interface 212. This command may direct the robot 104 to proceed to a designated destination, such as "living room" or "dining room". The robot 104 may then process this command, and use the autonomous navigation module 232 to determine the directions and distances associated with reaching the specified destination.

The memory 220 may store one or more task module 234. A task module 234 comprises instructions that, when executed, provide one or more functions associated with a particular task. In one example, the task may comprise a security or watchmen task in which the robot 104 travels throughout the physical environment 102 looking for events that exceed predetermined thresholds. Continuing the example, if the robot 104 detects that the ambient temperature is below a minimum level, or that water is present on the floor, or detects sound of broken glass, an alert may be generated. The alert may be given as an audible, visual, or electronic notification. For example, the electronic notification may involve the robot 104 transmitting data using one or more the communication interfaces 208.

In another example, the task may comprise a "follow me" feature in which the robot 104 follows a user. For example, the user may participate in a video call using the robot 104. The camera 344 on the mast 914 may be used to acquire video for transmission while the display 386 is used to present video that is received. The robot 104 may use data from one or more sensors 216 to determine a location of the user relative to the robot 104, and track and follow the user. In one implementation, computer vision techniques may be used to locate the user within image data acquired by the cameras 344. In another implementation, the user's voice may be detected by an array of microphones, and a direction to the voice with respect to the robot 104 may be established. Other techniques may be utilized either alone or in combination to allow the robot 104 to track a user, follow a user, or track and follow a user. The path of the robot 104 as it follows the user may be based at least in part on one or more of constraint cost values 136, the aggregate cost values 140, and so forth. For example, while the robot 104 is following the user down the hallway 108, the robot 104 may stay to the right side of the hallway 108. In some situations, while following a user the robot 104 may disregard some rules 132 or may disregard the speed values 144 for a particular area. For example, while following the user the robot 104 may not slow down while passing a doorway 110.

In yet another example, the task may allow for the robot 104 to be summoned to a particular location. The user may utter a voice command that is heard by a microphone on the robot 104, a microphone in a smart phone, or another device with a microphone such as a network enabled speaker or television. Alternatively, the user may issue a command using an app on a smartphone, wearable device, tablet, or other computing device. Given that the location of the device at which the command was obtained is known, the robot 104 may be dispatched to that location. Alternatively, if the location is unknown, the robot 104 may search for the user.

The speech processing module 236 may be used to process utterances of the user. Microphones 346 may acquire audio in the presence of the robot 104 and may send raw audio data 246 to an acoustic front end (AFE). The AFE may transform the audio data 246 (for example, a single-channel, 16-bit audio stream sampled at 16 kHz), captured by the microphone 346, into audio feature vectors 248 that may ultimately be used for processing by various components, such as a wakeword detection module 250, speech recognition engine, or other components. The AFE may reduce noise in the raw audio data 246. The AFE may also perform acoustic echo cancellation (AEC) or other operations to account for output audio data that may be sent to a speaker of the robot 104 for output. For example, the robot 104 may be playing music or other audio that is being received from a network 252 in the form of output audio data. To avoid the output audio interfering with the device's ability to detect and process input audio, the AFE or other component may perform echo cancellation to remove the output audio data from the input raw audio data 246, or other operations.

The AFE may divide the audio data into frames representing time intervals for which the AFE determines a number of values (i.e., features) representing qualities of the raw audio data 246, along with a set of those values (i.e., a feature vector or audio feature vector) representing features/qualities of the raw audio data 246 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 246, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 248 (or the raw audio data 246) may be input into a wakeword detection module 250 that is configured to detect keywords spoken in the audio. The wakeword detection module 250 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 250 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 250 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data (which may include one or more audio feature vectors 248 or the raw audio data 246) to one or more server(s) 254 for speech processing. The audio data corresponding to audio obtained by the microphone 346 may be sent to a server 254 for routing to a recipient device or may be sent to the server 254 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the local robot 104 prior to sending.

The robot 104 may connect to the network 252 using one or more of the network interfaces 212. One or more servers 254 may provide various functions, such as ASR, natural language understanding (NLU), providing content such as audio or video to the robot 104, and so forth.

The other modules 238 may provide other functionality, such as object recognition, speech recognition, speech synthesis, and so forth. For example, an ASR module may accept as input raw audio data 246 or audio feature vectors 248 and may produce as output a text string that is further processed and used to provide input, initiate operation of the movement module 122, a task module 234, and so forth. In one implementation, the text string may be sent via a network 252 to a server 254 for further processing. The robot 104 may receive a response from the server 254 and present output, perform an action, and so forth. For example, the raw audio data 246 may include the user saying "robot go to the dining room". The audio data representative of this utterance may be sent to the server 254 that return commands directing the robot 104 to the dining room of the home associated with the robot 104.

The utterance may result in a response from the server 254 that directs operation of other devices or services. For example, the user may say "robot wake me at seven tomorrow morning". The audio data may be sent to the server 254 that determines the intent and generates commands to instruct a device attached to the network 252 to play an alarm at 7:00 am the next day.

In another example, the other modules 238 may comprise a speech synthesis module that is able to convert text data to human speech.

Figure 3:
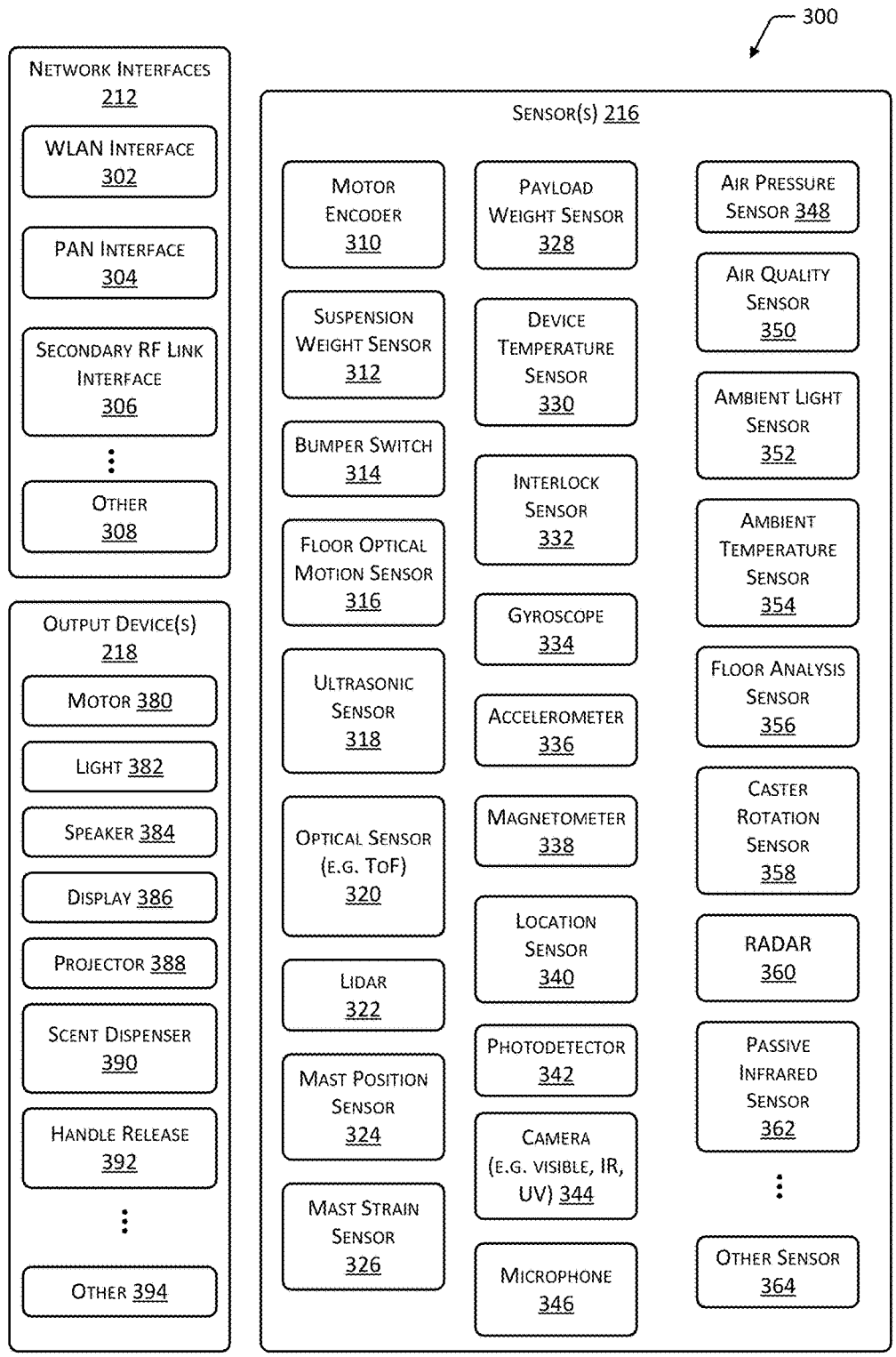
FIG. 3 is a block diagram of some components of the robot such as network interfaces, sensors, and output devices, according to some implementations.

FIG. 3 is a block diagram 300 of some components of the robot 104 such as network interfaces 212, sensors 216, and output devices 218, according to some implementations. The components illustrated here are provided by way of illustration and not necessarily as a limitation. For example, the robot 104 may utilize a subset of the particular network interfaces 212, output devices 218, or sensors 216 depicted here, or may utilize components not pictured.

The network interfaces 212 may include one or more of a WLAN interface 302, PAN interface 304, secondary radio frequency (RF) link interface 306, or other interface 308. The WLAN interface 302 may be compliant with at least a portion of the Wi-Fi® specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth®, wireless USB, Z-Wave®, ZigBee®, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilizes frequencies in the 2.4 GHz and 5 GHz Industrial Scientific and Medicine (ISM) bands, while the PAN interface 304 may utilize the 2.4 GHz ISM bands. The secondary RF link 306 may comprise a radio transmitter that operates in the 900 MHz ISM band, within a licensed band at another frequency, and so forth. The secondary RF link interface 306 may be utilized to provide backup communication between the robot 104 and other devices in the event that communication fails using one or more of the WLAN interface 302 or the PAN interface 304. For example, in the event the robot 104 travels to an area within the physical environment that does not have Wi-Fi® coverage, the robot 104 may use the secondary RF link interface 306 to communicate with another device such as a specialized access point, docking station, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G®, 4G®, LTE®, or other standards.

The robot 104 may include one or more of the following sensors 216. The sensors 216 depicted here are provided by way of illustration and not necessarily as a limitation. It is understood other sensors 216 may be included or utilized by the robot 104, while some sensors 216 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 232 may utilize the data from the motor encoder 310 to estimate a distance traveled.

A suspension weight sensor 312 provides information indicative of the weight of the robot 104 on the suspension system for one or more of the wheels 802 or the caster 804. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels 802 or the caster 804. In some situations, the safety module 228 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels 802, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. Safety module 228 utilize sensor data 242 obtained by the bumper switches 314 to modify the operation of the robot 104. For example, if the bumper switch 314 associated with a front of the robot 104 is triggered, the safety module 228 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilize sounds in excess of 20 kHz to determine a distance from the sensor to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic touch sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 242 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10' FOV, allowing the sensor to have an overall FOV of 40°.

In another implementation, a structured light pattern may be provided by the optical emitter. A portion of the structured light pattern may then be detected on the object using a sensor 216 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, safety module 228 and the autonomous navigation module 232 may utilize the sensor data 242 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 242 may be generated that is indicative of the presence of objects and the relative positions, shapes, and so forth is visible to the lidar 322. Data from the lidar 322 may be used by various modules. For example, the autonomous navigation module 232 may utilize point cloud data generated by the lidar 322 for localization of the robot 104 within the physical environment 102.

A mast position sensor 324 provides information indicative of a position of the mast. For example, the mast position sensor 324 may comprise limit switches associated with the mast extension mechanism that indicate whether the mast 914 is an extended or retracted position. In other implementations, the mast position sensor 324 may comprise an optical code on at least a portion of the mast 914 that is then interrogated by an optical emitter and a photodetector to determine the distance which the mast 914 is extended. In another implementation, the mast position sensor 324 may comprise an encoder wheel that is attached to a mast motor that is used to raise or lower the mast 914. The mast position sensor 324 may provide data to the safety module 228. For example, if the robot 104 is preparing to deploy the carrying handle, data from the mast position sensor 324 may be checked to determine if the mast 914 is retracted, and if not, the mast 914 may be retracted prior to deployment of the carrying handle. By retracting the mast 914 before the carrying handle is deployed, injury to the user as well as damage to the mast 914 is avoided as the user bends down to grasp the carrying handle.

A mast strain sensor 326 provides information indicative of a strain on the mast 914 with respect to the remainder of the robot 104. For example, the mast strain sensor 326 may comprise strain gauge or load cell that measures a side-load applied to the mast 914 or a weight on the mast 914 or downward pressure on the mast 914. The safety module 228 may utilize sensor data 242 obtained by the mast strain sensor 326. For example, if the strain applied to the mast 914 exceeds a threshold amount, the safety module 228 may direct an audible and visible alarm to be presented by the robot 104.

A payload weight sensor 328 provides information indicative of the weight associated with the modular payload bay 912. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 228 may utilize the payload weight sensor 328 to determine if the modular payload bay 912 has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries, one or more motors, and so forth. In the event the temperature exceeds a threshold value, the component associated with that device temperature sensor 330 may be shut down.

One or more interlock sensors 332 may provide data to the safety module 228 or other circuitry that prevents the robot 104 from operating in an unsafe condition. For example, the interlock sensors 332 may comprise switches that indicate whether an access panel is open, if the carrying handle is deployed, and so forth. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 242 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or another device. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 242 indicative of impinging light. For example, the photodetector 342 may provide data indicative of a color, intensity, duration, and so forth.

A camera 344 generates sensor data 242 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 242 comprising images being sent to the autonomous navigation module 232. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 232 may be acquired using a rolling shutter and subsequently may be processed to mitigate image artifacts.

One or more microphones 346 may be configured to acquire information indicative of sound present in the physical environment 102. In some implementations, arrays of microphones 346 may be used. These arrays may implement beamforming techniques to provide for directionality of gain. The robot 104 may use the one or more microphones 346 to acquire information from acoustic tags, accept voice input from users, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include hygrometer that provides information indicative of relative humidity.

An ambient light sensor 352 may comprise one or more photodetector's or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels 802 in contact with the floor may include an allegedly conductive pathway between the circuitry and the floor. By using two or more of these wheels 802, the circuitry may measure one or more of the electrical properties of the floor. Information obtained by the floor analysis sensor 356 may be used by one or more of the safety module 228, the autonomous navigation module 232 the task module 234, and so forth. For example, if the floor analysis sensor 356 determines that the floor is wet, the safety module 228 may decrease the speed of the robot 104 and generate a notification alerting the user.

The floor analysis sensor 356 may include other components as well. For example, coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 804 transitioned from an angle of 0° at a first time to 49° at a second time.

The sensors 216 may include a radar 360. The radar 360 may be used to provide information as to a distance, lateral position, and so forth, to an object.

The sensors 216 may include a passive infrared (PIR) sensor 362. The PIR 362 may be used to detect the presence of people, pets, hotspots, and so forth. For example, the PIR 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment 102 to provide landmarks for the autonomous navigation module 232. One or more touch sensors may be utilized to determine contact with a user or other object.

The robot 104 may include one or more output devices 218. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall 106, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

A handle release 392 may comprise an electrically operated mechanism such as one or more of a motor, solenoid, piezoelectric material, electroactive polymer, shape-memory alloy. In one implementation, the handle release 392 may release a latch and allows a spring to push the carrying handle into the deployed position. In another implementation, the electrically operated mechanism may provide the force that deploys the carrying handle. Retraction of the carrying handle may be manual or electronically activated.

In other implementations, other 394 output devices may be utilized. For example, the robot 104 may include a haptic output device that provides output that produces particular touch sensations to the user. Continuing the example, a motor 380 with an eccentric weight may be used to create a buzz or vibration to allow the robot 104 to simulate the purr of a cat.

Figure 4:
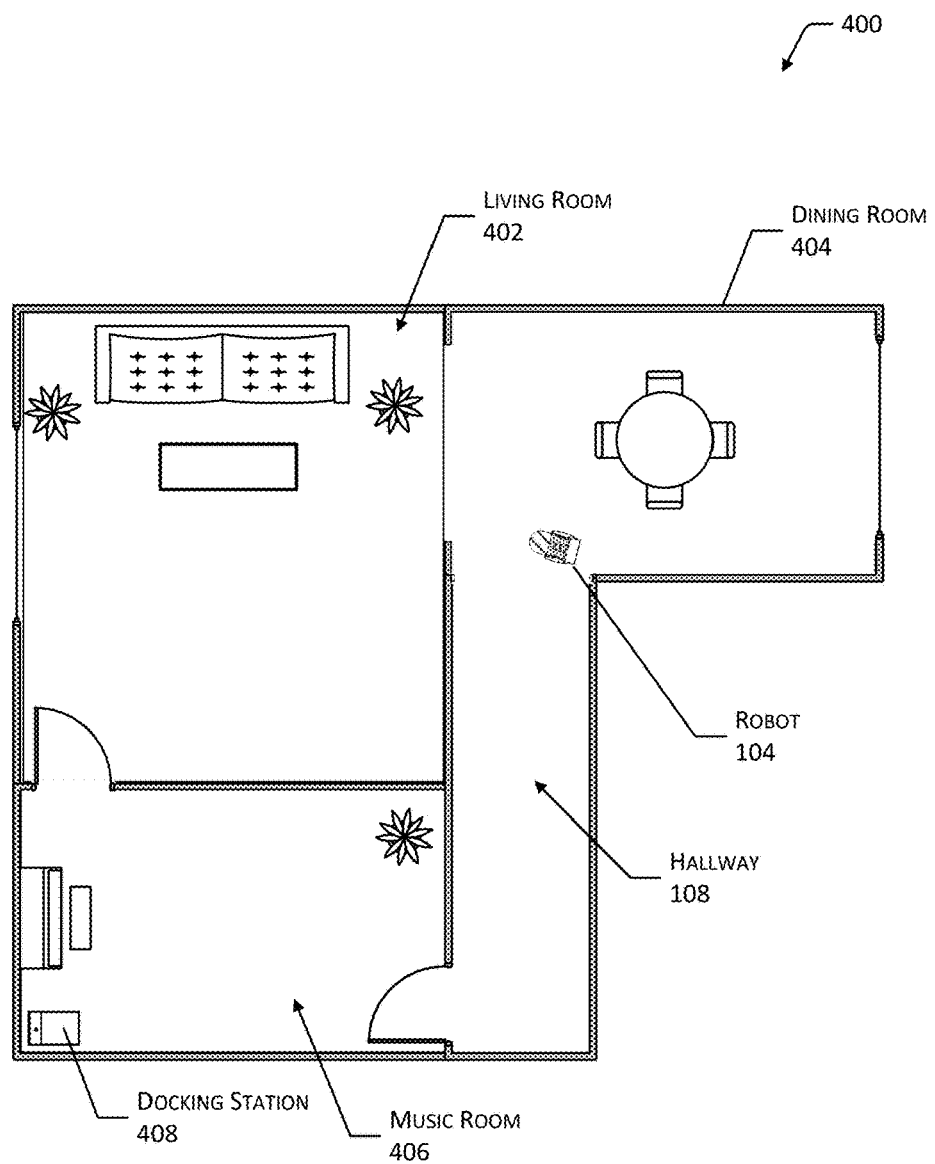
FIG. 4 illustrates a floorplan of a physical environment within which the robot may move, according to some implementations.

FIG. 4 illustrates a floorplan 400 of the physical environment 102 within which the robot 104 may move, according to some implementations. This environment 102 comprises part of a residence and includes a living room 402, dining room 404, hallway 108, and music room 406. Within the music room 406 is a docking station 408 for the robot 104. During use, various users may be present in or moving about in the physical environment 102, such as people or pets walking from room to room. Throughout the physical environment 102 there may be doorways 110, furniture, and so forth.

Figure 5:
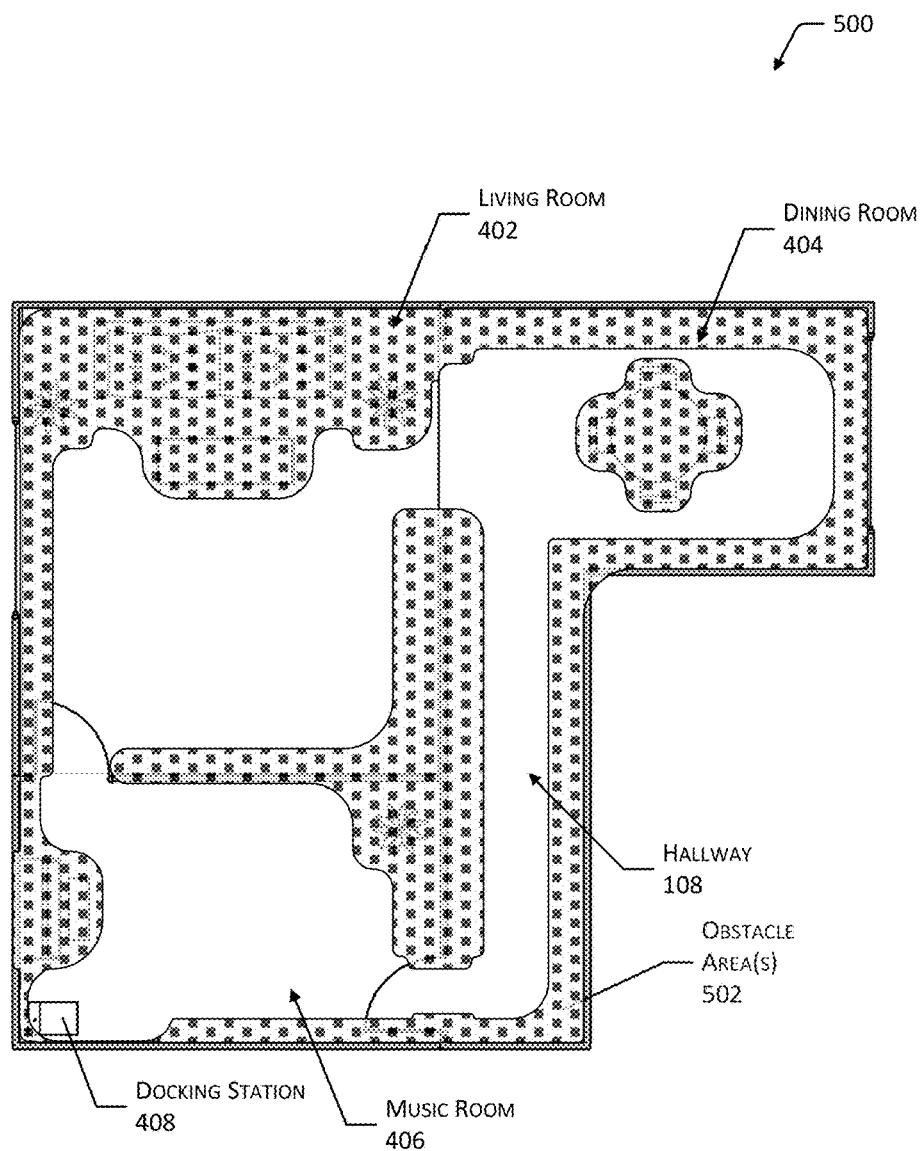
FIG. 5 illustrates obstacle areas of the physical environment that have been determined to preclude movement of the robot, according to some implementations.

FIG. 5 illustrates a view 500 of obstacle areas 502 of the physical environment 102 that have been determined to preclude movement of the robot 104, according to some implementations. As described above, the robot 104 may utilize the mapping module 124 to generate the occupancy map 126 that is representative of the placement of various obstacles in the physical environment 102. The obstacle areas 502 may indicate areas that in the physical environment 102 that exhibit an obstacle cost value 128 that is above a threshold value. The shape of the obstacle areas 502 may change over time. For example, an obstacle may move, such if the coffee table in the living room 402 is moved. In another example, the shape of the obstacle areas 502 may change over time as more precise information about the location of the obstacles is gathered. For example, as the robot 104 moves through the physical environment 102 and continues to gather sensor data 242, uncertainty as to the location of walls 106, size of the coffee table, location of the doors, and so forth may be reduced. Over time, the obstacle areas 502 may thus be reduced to eventually conform very closely to the physical perimeter of an obstacle such as the walls in a hallway or the walls of a stairwell.

Figure 6:
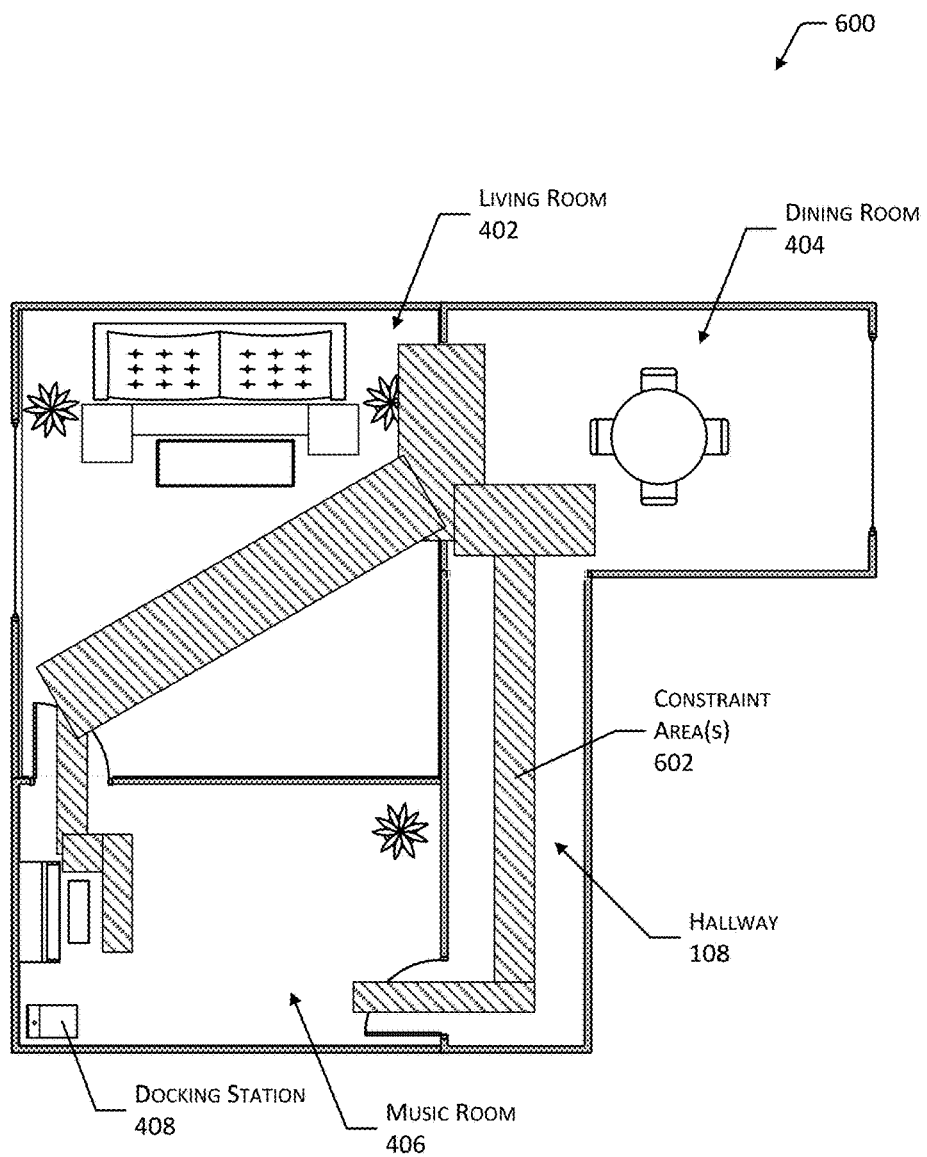
FIG. 6 illustrates constraint areas within which movement of the robot is constrained, according to some implementations.

FIG. 6 illustrates a view 600 of constraint areas 602 in the physical environment 102 within which movement of the robot 104 is constrained, according to some implementations. The constraint areas 602 comprise those areas that correspond to one or more of the rules 132 in the movement constraint data 130. For example, a constraint area 602 may be specified down the center of the hallway 108, near doorways 110, and so forth.

In some implementations the constraint areas 602 may be determined based on sensor data 242 indicative of location or movement of users in the physical environment 102. For example, data from sensors 216 in the living room 402 may indicate that users frequently walk directly from one doorway 110 to another. To minimize interference with the users, a constraint rule 132 may be generated that designates this as a constraint area 602.

The constraint areas 602 may comprise areas that exhibit a constraint cost value 136 that is above a threshold value. As described above, the constraint module 134 may use data in the occupancy map 126 and the movement constraint data 130 to determine constraint cost values 136 for particular areas.

Figure 7:
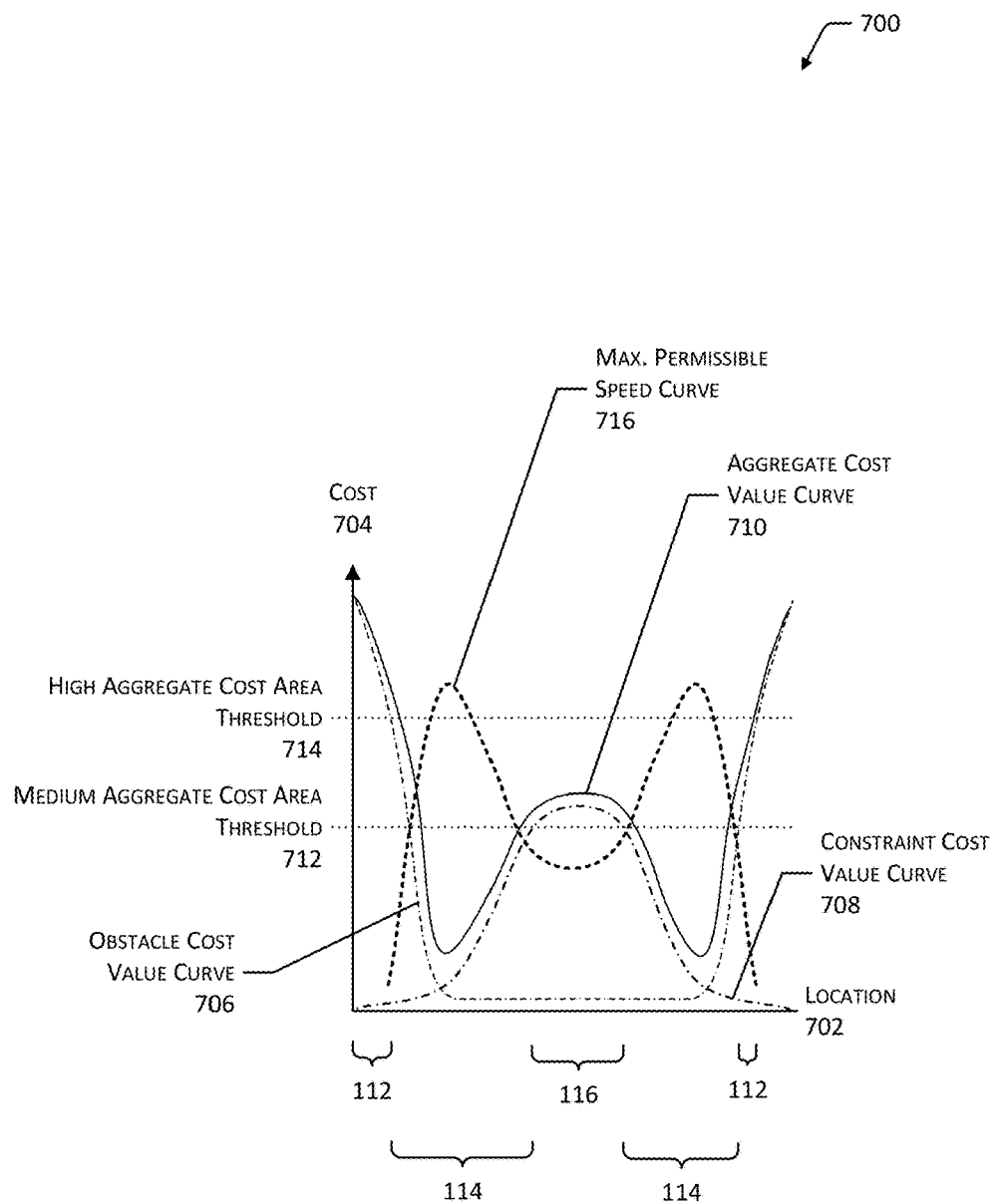
FIG. 7 comprises a graph of cost value curves for a cross section of a hallway, according to some implementations.

FIG. 7 comprises a graph 700 of cost value curves for the cross-section A-A of the hallway 108, according to some implementations. As described above, obstacle cost values 128 and constraint cost values 136 may be determined for particular areas, such as a square in a grid. The obstacle cost value 128 and the constraint cost value 136 for the same particular area may be used to determine the aggregate cost value 140. For example, the obstacle cost value 128 and the constraint cost value 136 may be summed to determine the aggregate cost value 140.

In this graph 700, location 702 across the width of the hallway 108 is represented on the horizontal axis while the value of a cost 704 is represented on the vertical axis. An obstacle cost value curve 706 represents the obstacle cost values 128 for particular locations 702 in the hallway 108. For example, the farthest left and the farthest right portions of the obstacle cost value curve 706 are at their greatest where they correspond to the left and right walls 106, respectively. In the center of the hallway 108 where no obstacles are present, the obstacle cost value 128 is significantly less.

Also shown is a constraint cost value curve 708 for a particular rule 132. This represents the constraint cost values 136 with respect to the hallway 108. For example, the constraint cost value curve 708 shown here corresponds to rule 132(1) that specifies the robot 104 is to avoid the center of a hallway 108. As a result, the constraint cost value curve 708 increases in cost 704 to a maximum in the center of the hallway 108, and exhibits minima at the left and right walls 106.

An aggregate cost value curve 710 is shown. In this illustration, the aggregate cost value curve 710 comprises a summation of the obstacle cost values 128 and the constraint cost values 136. As a result, the aggregate cost value curve 710 exhibits a "W" shape, with maxima at the left and right proximate to the walls 106 and a local and lesser maxima in the center of the hallway 108.

The aggregate cost values 140, or the aggregate cost value curve 710 that represents these, may be compared to one or more thresholds. For example, a medium aggregate cost area threshold 712 and a high aggregate cost area threshold 714 are depicted. The locations 702 for which the aggregate cost value curve 710 exceeds the high aggregate cost area threshold 714 may be deemed to be high aggregate cost areas 112. The robot 104 may be configured such that it will not enter such a high aggregate cost area 112. In this illustration, the high aggregate cost areas 112 comprise the walls 106 and some space adjacent to the walls 106.

The locations 702 for which the aggregate cost value curve 710 is less than the high aggregate cost area threshold 714 and greater than the medium aggregate cost area 116 comprises the medium aggregate cost area 116. The robot 104 will either avoid the medium aggregate cost area 116 in favor of travel within the low aggregate cost area 114, or if traversal is necessary, the robot 104 may move more slowly through the medium aggregate cost area 116.

The low aggregate cost area 114 comprises those locations 702 for which the cost 704 of the aggregate cost value curve 710 is less than the medium aggregate cost area threshold 712. For example, the low aggregate cost area 114 comprises the area between the high aggregate cost area 112 next to the walls 106 and the medium aggregate cost area 116 in the center of the hallway 108.

As described above, the speed value 144 for a particular area in the physical environment 102 may be determined based on the aggregate cost value 140 for that area. In this graph, a maximum permissible speed curve 716 that is representative of the maximum permissible speed 146 for a particular location 702 in the hallway 108. The maximum permissible speed curve 716 describes an "M" shape, with the two maxima corresponding to the low aggregate cost areas 114. As a result, the robot 104 may be permitted by the maximum permissible speed 146 to travel faster in the low aggregate cost areas 114 than in the medium aggregate cost areas 116.

In other implementations, the speed determination module 142 may utilize the obstacle cost value 128 and the constraint cost value 136 for a particular area to determine the speed values 144. For example, calculation of the aggregate cost value 140 may be omitted, and the obstacle cost value 128 and the constraint cost values 136 may be used to determine the speed values 144.

The depiction of low, medium, and high cost areas is made by way of illustration and not necessarily as a limitation. In other implementations, more or fewer grades or types of cost areas may be specified, or may be omitted entirely.

The values indicated by the curves may change over time. For example, as sensor data is obtained during operation of the robot 104, the accuracy of the position and size of obstacles may become more accurate. The occupancy map 126 may be updated to reflect these improvements, resulting in some cells of the occupancy map 126 having changed obstacle cost values 128. For example, an initial determination of the location of a wall 106 may be updated using additional sensor data, resulting in a cell that was previously deemed to have a wall 106 now being deemed to be empty. The movement constraint data 130 may be updated to add, remove, or change rules 132, change initial constraint cost values, and so forth. The curves depicted here may thus be representative of the system based on the data that is available at that particular time.

Figure 8:
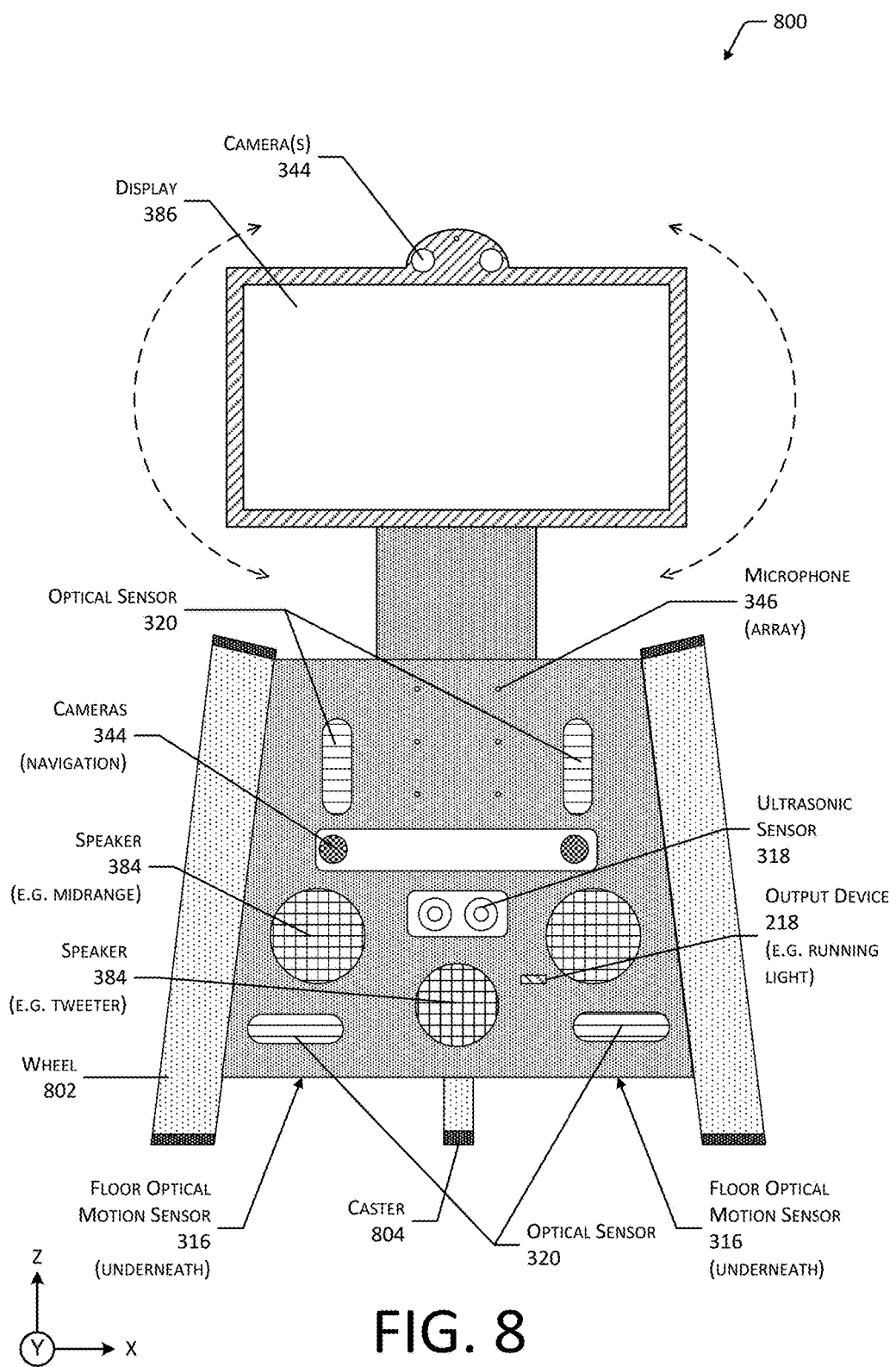
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 216. A first pair of optical sensors 320 are located along the lower edge of the front while a second pair of optical sensors 320 are located along an upper portion of the front. Between the second set of the optical sensors 320 is a microphone 346 array.

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90 and 110. A relatively wide FOV allows for easier detection of moving objects, such as users or pets that may be in the path of the robot 104. Also, the relatively wide FOV facilitates the robot 104 being able to detect objects when turning.

The sensor data 242 comprising images produced by this pair of cameras 344 can be used by the autonomous navigation module 232 for navigation of the robot 104. The cameras 344 used for navigation may be of different resolution from, or sensitive to different wavelengths than cameras 344 used for other purposes such as video communication. For example, the navigation cameras 344 may be sensitive to infrared light allowing the robot 104 to operate in darkness, while the camera 344 mounted above the display 386 sensitive visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

In this illustration, the display 386 is depicted with cameras 344 arranged above the display 386. The cameras 344 may operate to provide stereoimages of the physical environment 102, the user, and so forth. For example, an image from each of the cameras 344 above the display 386 may be accessed and used to generate stereo image data about a face of a user. This stereoimage data may then be used to facial recognition, user identification, gesture recognition, gaze tracking, and so forth. In other implementations, a single camera 344 may be present above the display 386.

As described earlier, the display 386 may be mounted on a movable mount. The movable mount may allow the display 386 to move along one or more degrees of freedom. For example, the display 386 may tilt as indicated above in FIG. 1, rotate as depicted here, and so forth. The size the display 386 may vary. In one implementation, the display 386 may be approximately 8 inches as measured diagonally from one corner to another.

An ultrasonic sensor 318 also mounted on the front of the robot 104 and may be used to provide sensor data 242 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically couple to one or more bumper switches 314.

Other output devices 218, such as one or more lights, may be on an exterior of the robot 104. For example, a running light may be arranged on a front of the robot 104. The running light may provide light for operation of one or more of the cameras, a visible indicator to the user that the robot 104 is in operation, and so forth.

One or more of the FOMS 316 are located on an underside of the robot 104.

Figure 9:
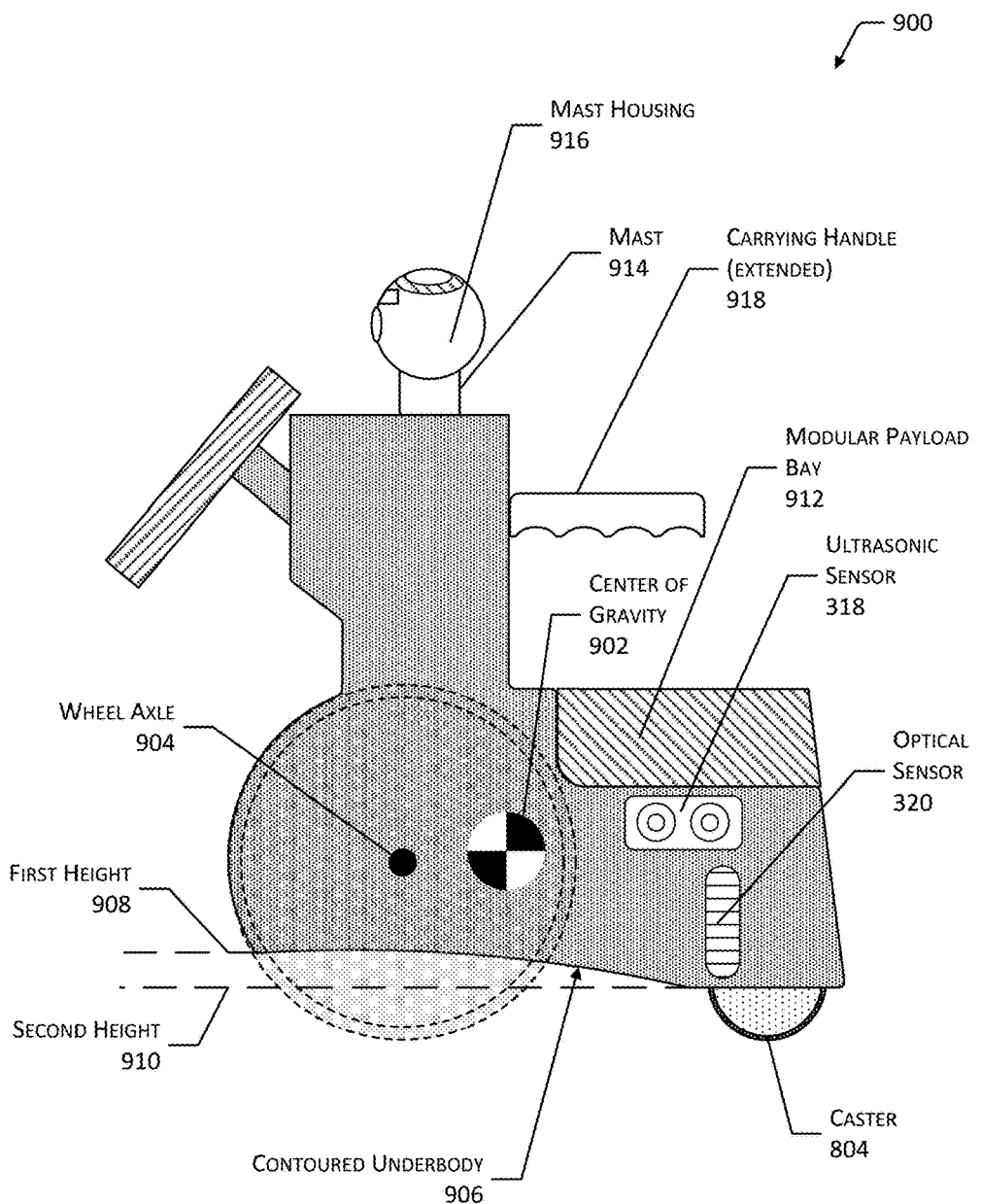
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

As described above, the placement of the heavier components of the robot 104 may be arranged such that a center of gravity (COG) 902 is located between a wheel axle 904 of the front wheels 802 and the caster 804. Such placement of the COG 902 may result in improved stability of the robot 104 and may also facilitate lifting by the carrying handle.

In this illustration, the caster 804 is shown in a trailing configuration, in which the caster 804 is located behind or aft of the wheel axle 904 and the center of gravity 902. In another implementation (not shown) the caster 804 may be in front of the axle of the wheels 802. For example, the caster 804 may be a leading caster 804 positioned forward of the center of gravity 902.

The robot 104 may encounter a variety of different floor surfaces and transitions between different floor surfaces during the course of operation. The robot 104 may include a contoured underbody 906 that transitions from a first height 908 at the front of the robot to a second height 910 that is proximate to the caster 804. This contour provides a ramp effect such that if the robot 104 encounters an obstacle that is below the first height 908, the contoured underbody 906 helps direct the robot 104 over the obstacle without lifting the driving wheels 802 clear from the floor. As a result, the robot 104 is better able to drive over small obstacles.

The robot 104 may include a modular payload bay 912 is located within the lower structure. The modular payload bay 912 provides one or more of mechanical or electrical connectivity with robot 104. For example, modular payload bay 912 may include one or more engagement features such as slots, cams, ridges, magnets, bolts, and so forth that are used to mechanically secure an accessory within the modular payload bay 912. In one implementation, the modular payload bay 912 may comprise walls within which the accessory may sit. In another implementation, the modular payload bay 912 may include other mechanical engagement features such as slots into which the accessory may be slid and engage.

The modular payload bay 912 may include one or more electrical connections. For example, the electrical connections may comprise a universal serial bus (USB) connection that allows for the transfer of data, electrical power, and so forth between the robot 104 and the accessory.

The robot 104 may incorporate a display 386 that may be utilized to present visual information to the user. In some implementations, the display 386 may be located with or affixed to the upper structure. In some implementations, the display 386 may comprise a touch screen that allows user input to be acquired. The display 386 may be mounted on a movable mount that allows motions along one or more axes. For example, the movable mount may allow the display 386 to be tilted, rotated, and so forth. The display 386 may be moved to provide a desired viewing angle to the user, to provide output from the robot 104, and so forth. For example, the output may comprise the display 386 being tilted forward and backward to provide a gestural output equivalent to a human nodding their head.

The robot 104 may incorporate a mast 914. The mast 914 provides a location from which additional sensors or output devices may be placed at a higher vantage point. The mast 914 may be fixed or extensible. The extensible mast 914 is depicted in this illustration. The extensible mast 914 may be transitioned between a retracted state, an extended state or placed at some intermediate value between the two.

At the top of the mast 914 may be a mast housing 916. In this illustration, the mast housing 916 is approximately spherical, however in other implementations other physical form factors such as cylinders, squares, or other shapes may be utilized.

The mast housing 916 may contain one or more sensors 216. For example, the sensors 216 may include a camera 344 having a field-of-view (FOV). In another example, the sensors 216 may include an optical sensor 320 to determine a distance to an object. The optical sensor 320 may look upward, and may provide information as to whether there is sufficient clearance above the robot 104 to deploy the mast 914. In another example, the mast housing 916 may include one or more microphones 346.

One or more output devices 218 may also be contained by the mast housing 916. For example, the output devices 218 may include a camera flash used to provide illumination for the camera 344, and indicator light that provides information indicative of a particular operation of the robot 104, and so forth.

Other output devices 218, such as one or more lights 382, may be elsewhere on an exterior of the robot 104. For example, a light 382 may be arranged on a side of the upper structure.

In some implementations, one or more of the sensors 216, output device 218, or the mast housing 916 may be movable. For example, the motor 380 may allow for the mast 914, the mast housing 916, or combination thereof to be rotated allowing the FOV to be panned from left to right.

The mast 914 may be configured as one or more safety features. For example, a portion of the mast 914 at the base of the mast 914 may be configured to deform or break in the event that a load exceeding a threshold amount is applied to the mast 914. In another implementation, the mounting point for the mast 914 to the upper structure includes one or more breakaway elements, allowing the mast 914 to break away from the upper structure in the event that a load exceeds the threshold amount. In yet another implementation, the mast 914 may comprise a flexible structure that bends when a load exceeding a threshold amount is applied to the mast 914.

In some implementations, the display 386 may be mounted to the mast 914. For example, the display 386 may be incorporated into the mast housing 916. In another example, the display 386 may be mounted to a portion of the mast 914, and so forth.

The robot 104 may occasionally need to be manually transported from one location to another. For example, the robot 104 may be unable to climb stairs, enter a vehicle, and so forth. To facilitate manual transportation, the robot 104 may include a carrying handle 918. The carrying handle 918 may be retractable such that, when not in use, the carrying handle 918 is not accessible. The carrying handle 918 may retract and deploy via translation, rotation, or extension. For example, the carrying handle 918 may slide out from the upper structure, or may rotate about a pivot point at one end. In the event the robot 104 is to be transported, the carrying handle 918 may be deployed. The carrying handle 918 may be positioned such that at least a portion of the carrying handle 918 is over the COG 902 of the robot 104. In another implementation, the carrying handle 918 may deploy upwards from the lower structure.

Deployment of the carrying handle 918 may include manual operation, such as the user pressing a handle release button, or may be electronically activated by the robot 104 using an electrically operated mechanism. For example, the electronic activation may involve the robot 104 generating a command that activates an electrically operated mechanism such as one or more of a motor, solenoid, piezoelectric material, electroactive polymer, shape-memory alloy, and so forth that releases a latch and allows a spring to push the carrying handle 918 into the deployed position. Continuing the example, the user may utter a command such as "robot, deploy carrying handle". Automated speech recognition systems may be used to recognize the utterance and as a result the electrically operated mechanism is activated. In another implementation, the electrically operated mechanism may provide the force that deploys the carrying handle 918. Retraction of the carrying handle 918 may be manual or electronically activated.

By utilizing a retractable carrying handle 918 may be stowed when not in use, safety of the robot 104 is improved. For example, the retracted carrying handle 918 is no longer exposed to be caught on some other object. Additionally, safety may be further improved by including safety interlock associated with the carrying handle 918. The safety interlock may be based on data such as information indicative of the deployment of the carrying handle 918, or may be based at least in part on sensor data. For example, a switch may be used to indicate whether the carrying handle 918 has been stowed. While the carrying handle 918 is extended, operation of one or more motors in the robot 104 may be inhibited or otherwise prevented from being operated. For example, while the carrying handle 918 is extended, the motors used to drive the wheels 802 may be rendered inoperable such that the robot 104 may not move. In another example, while the carrying handle 918 is extended, the mast 914 may be placed into a retracted position and remain there until the carrying handle 918 has been stowed. By limiting the motion of the robot 104 while the carrying handle 918 is extended for use, the possibility for an adverse interaction between the robot 104 and the user is reduced.

Figure 10:
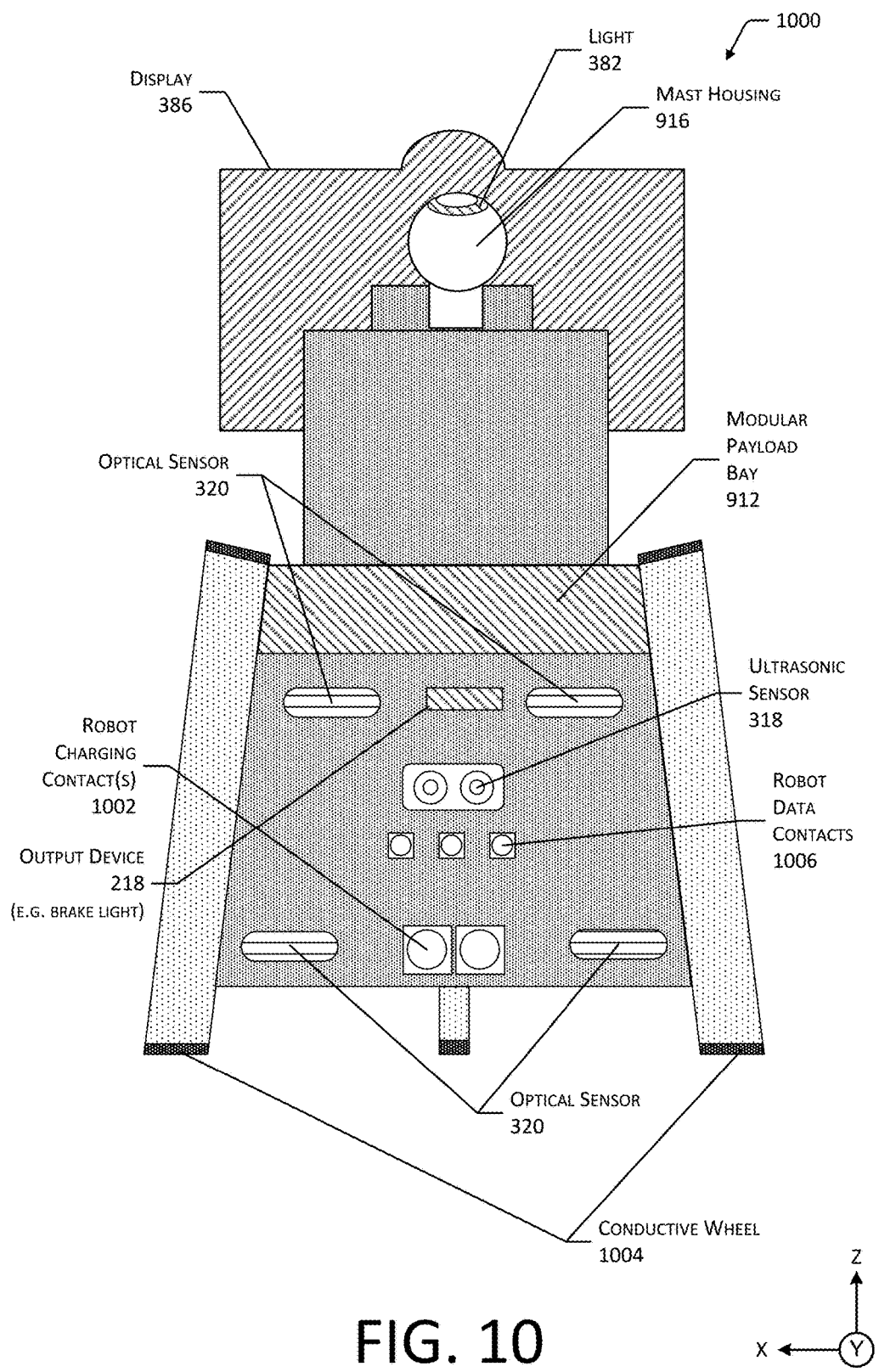
FIG. 10 is a back view of the robot, according to some implementations.

FIG. 10 is a back view 1000 of the robot 104, according to some implementations. In this view, as with the front, a first pair of optical sensors 320 are located along the lower edge of the rear of the robot 104, while a second pair of optical sensors 320 are located along an upper portion of the rear of the robot 104. An ultrasonic sensor 318 provides proximity detection for objects that are behind the robot 104.

Robot charging contacts 1002 may be provided on the rear of the robot 104. The charging contacts 1002 may comprise electrically conductive components that may be used to provide power from an external source such as a docking station 408 to the robot 104. In other implementations, wireless charging may be utilized. For example, wireless inductive or wireless capacitive charging techniques may be used to provide electrical power to the robot 104.

In some implementations the wheels 802 may be electrically conductive wheels 1004, that provide an electrical conductive pathway between the robot 104 and the floor.

One or more robot data contacts 1006 may be arranged along the back of the robot 104. The robot data contacts 1006 may be configured to establish contact with corresponding base data contacts within the docking station 408. The robot data contacts 1006 may provide optical, electrical, or other connections suitable for the transfer of data.

Other output devices 218, such as one or more lights, may be on an exterior of the back of the robot 104. For example, a brake light may be arranged on the back surface of the robot 104 to provide users an indication that the robot 104 is stopping.

Figure 11:
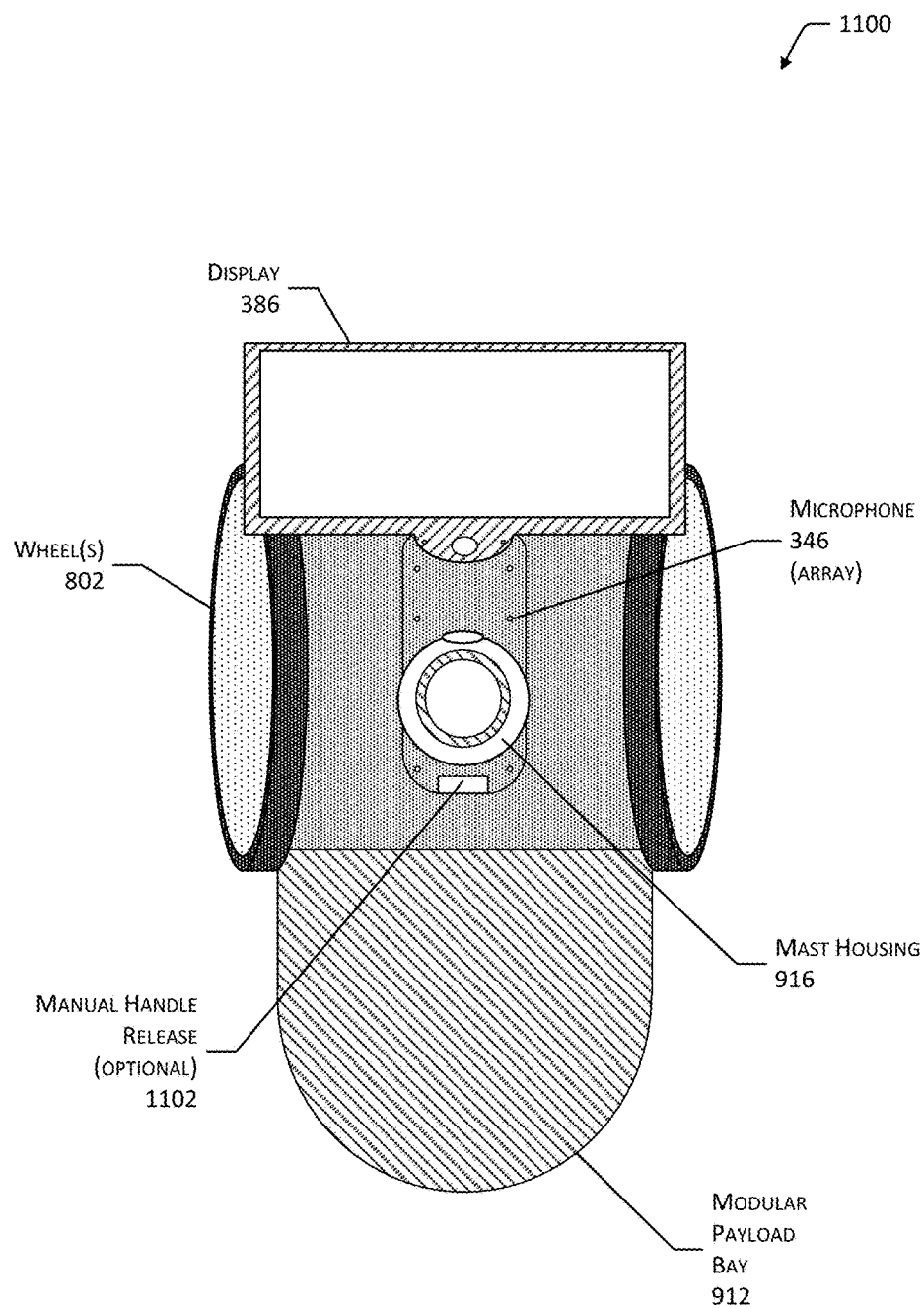
FIG. 11 is a top view of the robot, according to some implementations.

FIG. 11 is a top view 1100 of the robot 104, according to some implementations. In some implementations, a microphone 346 array may be emplaced along an upper surface of the upper structure. For example, the microphone 346 array is shown here comprising 8 microphones 346, two of which are concealed by the mast housing 916.

In some implementations, a manual handle release 1102 may be optionally provided. For example, the manual handle release 1102 when actuated may result in the carrying handle 918 being extended.

Figure 12:
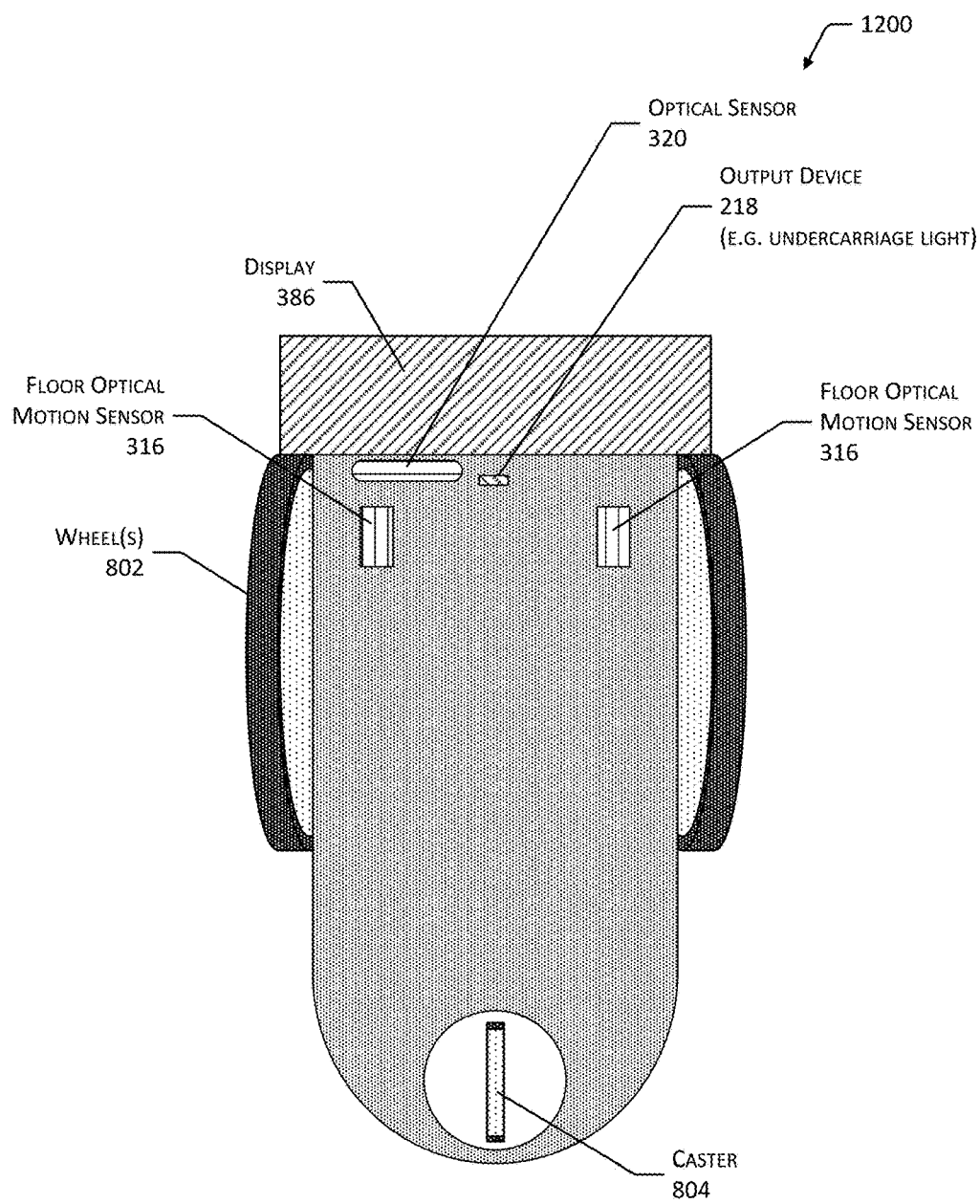
FIG. 12 is a bottom or underside view of the robot, according to some implementations.

FIG. 12 is a bottom 1200 or underside view of the robot 104, according to some implementations. In this illustration, a pair of FOMS 316 our visible arranged on the underside of the robot 104 proximate to the front and on the left and right sides, proximate to the wheels 802. In another implementation, one or more FOMS 316 may be arranged along a centerline of the robot 104 running front and back.

One or more optical sensors 320 may be mounted on the underside proximate to one or more of the front edge or back edge of the robot 104. These optical sensors 320 may be used to detect the presence of a falling edge, such as a stair. For example, the optical sensors 320 mounted on the front or rear of the robot 104 may have a field of view that results in a blind spot close to the robot 104. In the event that the user picks up and moves the robot 104, the robot 104 could be placed into a situation where it is unable to move safely without toppling from a falling edge. As a result, optical sensors 320 may be mounted at or near the underside of the robot 104 to provide information about this region.

In other implementations, other sensors 216 may be mounted elsewhere to determine falling edges. For example, the optical sensors 320 on the front of the robot 104 may have a FOV that is directed downwards to allow for detection of the falling edge.

An output device 218, such as one or more undercarriage lights may be provided. For example, a light may be arranged on an underside of the robot 104, proximate to or at a front edge.

Also depicted is the caster 804. In one implementation, caster 804 may be freewheeling, that is free to swivel about. In another implementation, the caster 804 may be driven, such that a motor or other actuator may change the direction of the caster 804 to facilitate steering of the robot 104.

Figure 13:
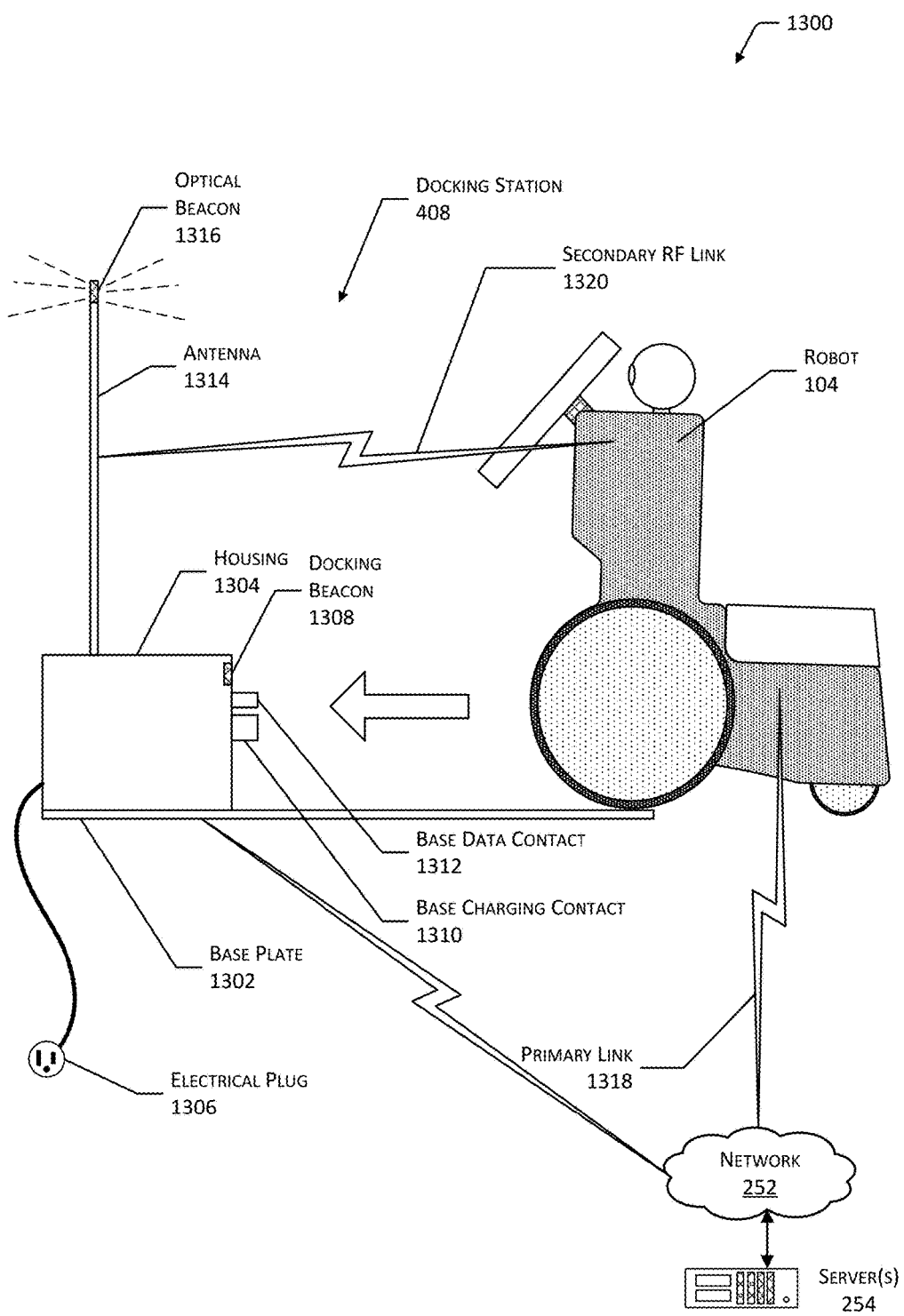
FIG. 13 depicts a diagram of a docking station with a secondary radio frequency link interface, according to some implementations.

FIG. 13 depicts a diagram 1300 of a docking station 408 with a secondary RF link interface 306, according to some implementations. The docking station 408 may comprise a base plate 1302. A housing 1304 may include electronics such as a power supply 202, one or more processors 204, one or more communication interfaces 208, and so forth. The docking station 408 may obtain power from an electrical plug 1306. For example, the electrical plug 1306 may be plugged into a household electrical outlet. In some implementations, the docking station 408 may include an uninterruptible power supply or alternative power source such as a fuel cell.

A docking beacon 1308 provides indicia suitable for guiding the robot 104 into the docking station 408 at a predetermined location. At that predetermined location, the robot 104 may engage one or more base charging contacts 1310 or base data contacts 1312. For example, the robot charging contacts 1002 may come in contact with the corresponding base charging contacts 1310 while the robot data contacts 1006, the contact with the corresponding base data contacts 1312. In other implementations, one or more of the base charging contacts 1310 or the base data contacts 1312 may be along the base plate 1302, or otherwise configured to mate with corresponding robot charging contacts 1002 or robot data contacts 1006 located on an underside of the robot 104.

In other implementations, wireless power transfer may be used to charge the robot 104. For example, the base charging contacts 1310 may be omitted and a wireless inductive or wireless capacitive charging system may be used to provide electrical power to the robot 104.

The base charging contacts 1310 may be utilized to provide electrical power to charge the batteries on board the robot 104, supply power to the robot for operation while docked, and so forth. The base data contacts 1312 may be used to provide data communication with the robot 104 while docked. For example, the base data contacts 1312 may be used to deliver updates to the instructions stored within the memory 220 of the robot 104.

The docking station 408 may include an antenna 1314 suitable for use with one or more of the network interfaces 212. For example, the antenna 1314 may be used for the secondary RF link interface 306.

One or more optical beacons 1316 may be provided on the docking station 408 to facilitate the robot 104 locating the docking station 408 within the physical environment 102. For example, the optical beacons 1316 may be placed atop the antenna 1314 to provide and improve line of sight with the robot 104. In some implementations, the robot 104 may utilize the camera 344 in the mast housing 916 to detect the optical beacon 1316. For example, the mast 914 may be extended to increase the height of the mast housing 916 and the camera 344 therein. The increased height of the camera 344 combined with the location of the optical beacons 1316 atop antenna 1314 may provide an improved line of sight for the robot 104, facilitating locating of the docking station 408 by the robot 104.

The robot 104 may utilize a primary link 1318 to establish communication with other devices such as the network 252, one or more servers 254, the docking station 408, of the robot's 104, and so forth. For example, the primary link 1318 may comprise a Wi-Fi WLAN interface 302

In some implementations, the primary link 1316 may be unavailable. For example, a portion of the home may have inadequate Wi-Fi coverage. As described above, the docking station 408 may include a secondary RF link interface 306 that establishes a secondary RF link 1320 with the robot 104. In the event that a primary link 1318 is unavailable, the robot 104 may maintain communication with the docking station 408 using secondary RF link 1320. The docking station 408 may utilize one or more network interfaces 212 on board the docking station 408 to establish communication with the network 252 or other devices. Continuing the example above, if the robot 104 finds itself in an area with inadequate Wi-Fi coverage, it may use the secondary RF link 1320 to access the docking station 408 and then access an external server 254 via the docking station 408.

In some implementations, the secondary RF link 1320 may also be used for navigational purposes. For example, secondary RF link 1320 may be used as a beacon to provide navigational input. In another example, the secondary RF link 1320 may be used to determine a distance from the docking station 408. Continuing this example, the robot 104 may send a request to the docking station 408 which then responds within a predetermined time. Based on the value of the predetermined time and the propagation delay associated with transmission, an estimated distance between the docking station 408 and robot 104 may be determined.

The docking station 408 may provide other functions as well. For example, the docking station 408 may include additional resources such as processors, memory, and so forth that allow the docking station 408 to provide various functions such as automated speech recognition, natural language understanding, and so forth. For example, if the robot 104 is unable to contact an external server to process speech acquired using a microphone 346, the audio data may be transmitted to the docking station 408 for local processing by the docking station 408. This may provide redundancy and still allow some functionality in the event that a wide area network connection, such as to the internet, is unavailable. In some implementations, the docking station 408 may be configured to operate as an edge server to a network accessible resource, such as an external server.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining an obstacle cost value for an area within a physical environment, wherein the obstacle cost value is indicative of a first confidence value associated with presence of a first object in or aspect of the area that impedes movement;
   determining one or more rules related to movement of an automated guided device within the physical environment, the one or more rules indicative of one or more of:
   constraint areas within the physical environment that the automated guided device is to avoid,
   preferred areas of the physical environment that the automated guided device is to move through, or
   speed constraints that the automated guided device is to use when traveling through certain areas of the physical environment;
   determining a subset of the one or more rules that are applicable to the area;
   determining a constraint cost value for the area based on the subset of the one or more rules;
   determining an aggregate cost value based on the obstacle cost value and the constraint cost value;
   determining, based on the aggregate cost value, a first speed value for moving the automated guided device within the area; and
   moving the automated guided device through a portion of the area at a speed corresponding to the first speed value.

2. The method of claim 1, wherein the determining the obstacle cost value comprises:
   accessing data obtained by one or more sensors, wherein the data is associated with the area;
   determining, based on the data, that the automated guided device is able to move through the area; and
   setting the obstacle cost value to a predetermined value.

3. The method of claim 1, wherein the one or more rules specify one or more of:
   the automated guided device is to avoid travel along a center section of a passageway,
   the automated guided device is to travel at a reduced speed while located in an area proximate to a doorway, or
   the automated guided device is to preferentially move near a wall without intersecting the wall.

4. The method of claim 1, further comprising:
   determining information indicative of a feature in the physical environment, wherein the feature comprises one or more of a second object in the physical environment or an aspect of the physical environment; and
   wherein the determining the constraint cost value comprises:
   retrieving, from the one or more rules, a rule that is associated with the feature;
   retrieving a predetermined value associated with the feature; and
   storing the predetermined value as the constraint cost value for the area.

5. The method of claim 1, further comprising:
   determining feature data indicative of presence of a feature in the physical environment; and
   wherein the determining the constraint cost value comprises:
   determining a rule, from the one or more rules, that is associated with the feature data;

accessing a second confidence value associated with the determination of the feature data being accurate;

retrieving a predetermined value associated with the rule; and generating the constraint cost value by multiplying the second confidence value with the predetermined value.

6. The method of claim 1, further comprising:

acquiring sensor data from one or more sensors;

determining feature data indicative of one or more features in the physical environment based at least in part on the sensor data; and wherein the determining the subset of the one or more rules that are applicable to the area comprises retrieving the one or more rules that are associated with the feature data.

7. The method of claim 1, further comprising:

determining a route from an origin point to a destination point within the physical environment, wherein the route comprises a route segment that traverses the area.

8. The method of claim 1, further comprising:

determining a second aggregate cost value for a second area within the physical environment; and determining, based at least in part on the aggregate cost value and the second aggregate cost value, a route from an origin point to a destination point within the physical environment.

9. The method of claim 1, further comprising:

determining respective aggregate cost values for a plurality of areas within the physical environment;

determining a first route from an origin point in the physical environment to a destination point in the physical environment that traverses a first subset of the plurality of areas;

determining a first route cost comprising a sum of the respective aggregate cost values for the first subset of the plurality of areas;

determining a second route from the origin point to the destination point that traverses a second subset of the plurality of areas;

determining a second route cost comprising a sum of the respective aggregate cost values for the second subset of the plurality of areas;

determining the first route cost is less than the second route cost; and moving the automated guided device along the first route.

10. A method comprising:

accessing an obstacle cost value for a region within a physical environment, wherein the obstacle cost value is indicative of a first confidence value associated with presence of a first object in or an aspect of the region that impedes movement;

accessing movement constraint data indicative of a set of rules specifying one or more constraint areas of movement of an automated guided device, the one or more constraint areas indicative of areas within the physical environment that the automated guided device can traverse but is to avoid;

determining, for the region, a rule from the set of rules that is associated with the region;

determining a constraint cost value based at least in part on the rule;

determining a speed value for the region based on the obstacle cost value and the constraint cost value; and moving the automated guided device in the region at a speed corresponding to the speed value.

11. The method of claim 10, further comprising:

acquiring sensor data from one or more sensors;

determining feature data indicative of one or more features in the physical environment based at least in part on the sensor data, wherein the one or more features comprises one or more of a second object in the physical environment or an aspect of the physical environment; and wherein the determining the constraint cost value comprises retrieving a predetermined value that is associated with the feature data.

12. The method of claim 10, wherein the set of rules specify one or more of:

the automated guided device is to avoid a center of a passageway, the automated guided device is to travel at a reduced speed while in a region proximate to a doorway, or the automated guided device is to preferentially move near a wall without intersecting the wall.

13. The method of claim 10, wherein the constraint cost value for the region comprises a predetermined value that is associated with at least one rule in at least a portion of the set of rules.

14. The method of claim 10, further comprising:

determining feature data indicative of presence of a feature in the physical environment; and wherein the determining the constraint cost value comprises:

determining the rule, from the set of rules, that is associated with the feature data;

accessing a second confidence value associated with the determination of the feature data being accurate;

retrieving a predetermined value associated with the rule; and generating the constraint cost value by multiplying the second confidence value with the predetermined value.

15. The method of claim 10, further comprising:

determining respective aggregate cost values for a plurality of regions within the physical environment;

determining a first route from an origin point to a destination point that traverses a first subset of the plurality of regions;

determining a first route cost comprising a sum of the respective aggregate cost values for the first subset of the plurality of regions;

determining a second route from the origin point to the destination point that traverses a second subset of the plurality of regions;

determining a second route cost comprising a sum of the respective aggregate cost values for the second subset of the plurality of regions;

determining the first route cost is less than the second route cost; and moving the automated guided device along the first route.

16. The method of claim 10, wherein the obstacle cost value that is indicative of the first object in or an aspect of the region that impedes movement in the region is greater than a greatest constraint cost value in the set of rules.

17. The method of claim 10, further comprising:

acquiring sensor data; and determining the obstacle cost value by processing the sensor data with a simultaneous localization and mapping (SLAM) algorithm.

18. A method comprising:

accessing an obstacle cost value for a region within an environment;

accessing first data indicative of a set of rules that specify preferred areas for movement of an automated guided device within the environment;

accessing second data that is associated with at least the region, the second data comprising a subset of the first data;

determining a constraint cost value based at least in part on the first data;

determining an aggregate cost value for the region based on the obstacle cost value and the constraint cost value; and moving the automated guided device in the region at a speed that is based on the aggregate cost value.

19. The method of claim 18, further comprising:

acquiring sensor data from one or more sensors;

determining feature data indicative of one or more features in the environment based at least in part on the sensor data, wherein the one or more features comprises one or more of an object in the environment or an aspect of the environment; and wherein the determining the constraint cost value comprises retrieving a predetermined value that is associated with the feature data.

20. The method of claim 18, further comprising:

determining feature data indicative of presence of a feature in the environment; and wherein the determining the constraint cost value comprises:

determining a rule, from the set of rules, that is associated with the feature data;

accessing a confidence value associated with the determination of the feature data being accurate;

retrieving a predetermined value associated with the rule; and generating the constraint cost value by multiplying the confidence value with the predetermined value.

* * * * *

UNITED STATES PATENT AND TRADEMARK OFFICE
CERTIFICATE OF CORRECTION

PATENT NO. : 11,300,963 B1
APPLICATION NO. : 15/681097
DATED : April 12, 2022
INVENTOR(S) : Roger Robert Webster et al.

It is certified that error appears in the above-identified patent and that said Letters Patent is hereby corrected as shown below:

On the Title Page

Item (57) ABSTRACT:

The 4th sentence currently reads: "A set of rules for preferred locations of robot movement is used to access the occupancy map and to determine constraint cost value for the particular areas.".

It should read: --A set of rules for preferred locations of robot movement is used to access the occupancy map and to determine constraint cost values for the particular areas.--.

Signed and Sealed this
Thirty-first Day of May, 2022

Katherine Kelly Vidal
*Director of the United States Patent and Trademark Office*